United States Patent
Lv

(10) Patent No.: US 12,299,736 B2
(45) Date of Patent: May 13, 2025

(54) METHOD, APPARATUS, ELECTRONIC DEVICE AND STORAGE MEDIUM FOR GUIDING AND DISPLAYING A RELATED CONTENT

(71) Applicant: Beijing Youzhuju Network Technology Co., Ltd., Beijing (CN)

(72) Inventor: Jianjun Lv, Beijing (CN)

(73) Assignee: Beijing Youzhuju Network Technology Co., Ltd., Beijing (CN)

(*) Notice: Subject to any disclaimer, the term of this patent is extended or adjusted under 35 U.S.C. 154(b) by 0 days.

(21) Appl. No.: 18/667,765

(22) Filed: May 17, 2024

(65) Prior Publication Data

US 2024/0386478 A1 Nov. 21, 2024

(51) Int. Cl.
*G06Q 30/00* (2023.01)
*G06F 9/451* (2018.01)
*G06Q 30/0601* (2023.01)
*G06F 3/04817* (2022.01)

(52) U.S. Cl.
CPC ......... *G06Q 30/0643* (2013.01); *G06F 9/453* (2018.02); *G06F 3/04817* (2013.01)

(58) Field of Classification Search
CPC ............... G06Q 30/00; G06Q 30/0601; G06Q 30/0613; G06Q 30/0641
See application file for complete search history.

(56) References Cited

U.S. PATENT DOCUMENTS

| | | | |
|---|---|---|---|
| 7,334,184 B1 * | 2/2008 | Simons | G06F 16/9535 715/234 |
| 7,597,254 B2 * | 10/2009 | Miller | G01G 19/4144 235/383 |
| 9,298,786 B1 * | 3/2016 | Wang | G06F 16/9535 |

(Continued)

FOREIGN PATENT DOCUMENTS

| | | |
|---|---|---|
| CN | 108805641 A | 11/2018 |
| CN | 110782272 A | 2/2020 |

(Continued)

OTHER PUBLICATIONS

Gerald L. Lohse et al. "Electronic Shopping", Communications of the ACM, Jul. 1998 / vol. 41, No. 7, pp. 81-88. (Year: 1998).*

(Continued)

*Primary Examiner* — Christopher B Seibert
(74) *Attorney, Agent, or Firm* — BakerHostetler

(57) ABSTRACT

The disclosure relates to a method, apparatus, an electronic device, and a storage medium for guiding and displaying a related content. The method includes: displaying a target page, wherein the target page displays first guidance information corresponding to a target tag; displaying a transaction scenario page corresponding to the target tag if a trigger instruction for the target event corresponding to the target tag is detected, and a trigger duration of the trigger instruction satisfies a first condition; and displaying a transaction scenario page corresponding to the target tag if the trigger instruction for the target event corresponding to the target tag is detected, and a trigger duration of the trigger instruc- (Continued)

tion satisfies a second condition. The possibility of users participating in transaction activities and a guidance effect are improved.

20 Claims, 14 Drawing Sheets

(56) References Cited

U.S. PATENT DOCUMENTS

| | | | |
|---|---|---|---|
| 2002/0104886 A1* | 8/2002 | Martin | B82Y 15/00 235/462.45 |
| 2002/0170476 A1* | 11/2002 | Bogner | A01C 21/005 111/900 |
| 2002/0174023 A1* | 11/2002 | Grey | G06Q 40/04 705/37 |
| 2003/0222146 A1* | 12/2003 | Schmidt | G06K 7/10603 235/462.45 |
| 2004/0173684 A1* | 9/2004 | Wilz, Sr. | G06K 7/10554 235/462.45 |
| 2005/0028082 A1* | 2/2005 | Topalov | G06F 15/167 715/224 |
| 2005/0256841 A1* | 11/2005 | Rawat | G06F 40/174 |
| 2006/0069763 A1* | 3/2006 | Kido | H04L 67/1001 709/223 |
| 2006/0156228 A1* | 7/2006 | Gallo | G06F 3/0483 345/581 |
| 2009/0030749 A1* | 1/2009 | Drummond | G06Q 30/06 705/7.31 |
| 2009/0109037 A1* | 4/2009 | Farmer | G06Q 30/0631 705/40 |
| 2009/0204881 A1* | 8/2009 | Murthy | G06F 40/174 715/226 |
| 2009/0295592 A1* | 12/2009 | Mizukawa | G07G 1/145 340/691.5 |
| 2011/0041170 A1* | 2/2011 | Wankmueller | H04L 63/12 715/764 |
| 2011/0047608 A1* | 2/2011 | Levenberg | H04L 63/0807 726/7 |
| 2012/0131454 A1* | 5/2012 | Shah | G06Q 30/0257 715/702 |
| 2012/0236037 A1* | 9/2012 | Lessing | G06F 3/0485 345/661 |
| 2012/0242692 A1* | 9/2012 | Laubach | G06F 3/04883 345/629 |
| 2013/0047242 A1* | 2/2013 | Radhakrishnan | H04L 9/3231 726/9 |
| 2013/0090939 A1* | 4/2013 | Robinson | G06Q 10/10 705/2 |
| 2013/0090942 A1* | 4/2013 | Robinson | G06Q 10/10 705/2 |
| 2013/0103446 A1* | 4/2013 | Bragdon | G06F 3/0488 705/7.15 |
| 2013/0117689 A1* | 5/2013 | Lessing | G06F 3/04883 715/752 |
| 2013/0145295 A1* | 6/2013 | Bocking | H04M 1/7243 715/764 |
| 2013/0159941 A1* | 6/2013 | Langlois | H04M 1/7243 715/863 |
| 2013/0268847 A1* | 10/2013 | Kim | G06F 3/0483 715/251 |
| 2015/0154700 A1* | 6/2015 | Hackett | G06Q 40/04 705/37 |
| 2015/0379595 A1* | 12/2015 | Gange | G06Q 30/0283 705/7.35 |
| 2016/0008005 A1* | 1/2016 | McEwen | A61B 17/1355 606/202 |
| 2016/0008006 A1* | 1/2016 | McEwen | A61B 17/1355 606/202 |
| 2016/0132205 A1* | 5/2016 | Ramakrishnan | G06F 3/04817 715/765 |
| 2016/0377545 A1* | 12/2016 | Wang | G01N 21/6456 250/459.1 |
| 2017/0023913 A1* | 1/2017 | Lecher | G04C 17/0091 |
| 2018/0348962 A1* | 12/2018 | Cranfill | G06F 40/103 |
| 2019/0183255 A1* | 6/2019 | Louks | A61G 7/05707 |
| 2020/0008459 A1* | 1/2020 | Angelo, Jr. | A23L 33/30 |
| 2020/0058058 A1* | 2/2020 | Scholl | G06Q 30/0601 |
| 2020/0104194 A1* | 4/2020 | Chalmers | G06F 3/165 |
| 2021/0188395 A1* | 6/2021 | Wendt | B62M 19/00 |
| 2022/0067830 A1* | 3/2022 | Amri | G06Q 10/087 |
| 2022/0087498 A1* | 3/2022 | Madden | A47L 9/2805 |
| 2022/0105269 A1* | 4/2022 | Zhong | G16H 20/60 |
| 2022/0242302 A1* | 8/2022 | Goetz | B60P 7/0869 |
| 2023/0169334 A1* | 6/2023 | Takimoto | G06N 3/09 706/25 |

FOREIGN PATENT DOCUMENTS

| | | |
|---|---|---|
| CN | 111192079 A | 5/2020 |
| CN | 113613053 A | 11/2021 |
| CN | 114168021 A | 3/2022 |
| CN | 114691902 A | 7/2022 |
| WO | WO 2022/247326 A1 | 12/2022 |

OTHER PUBLICATIONS

Gonçalves, Sofia Valença Enes. The moderating role of digital coupon vehicles and expiration dates on purchase intent. Diss. 2018. (Year: 2018).*

* cited by examiner

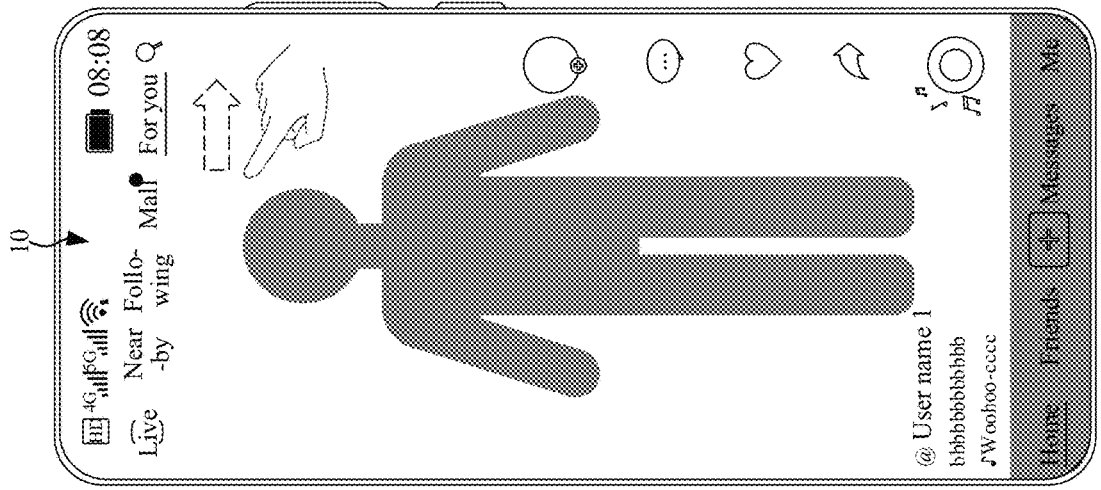
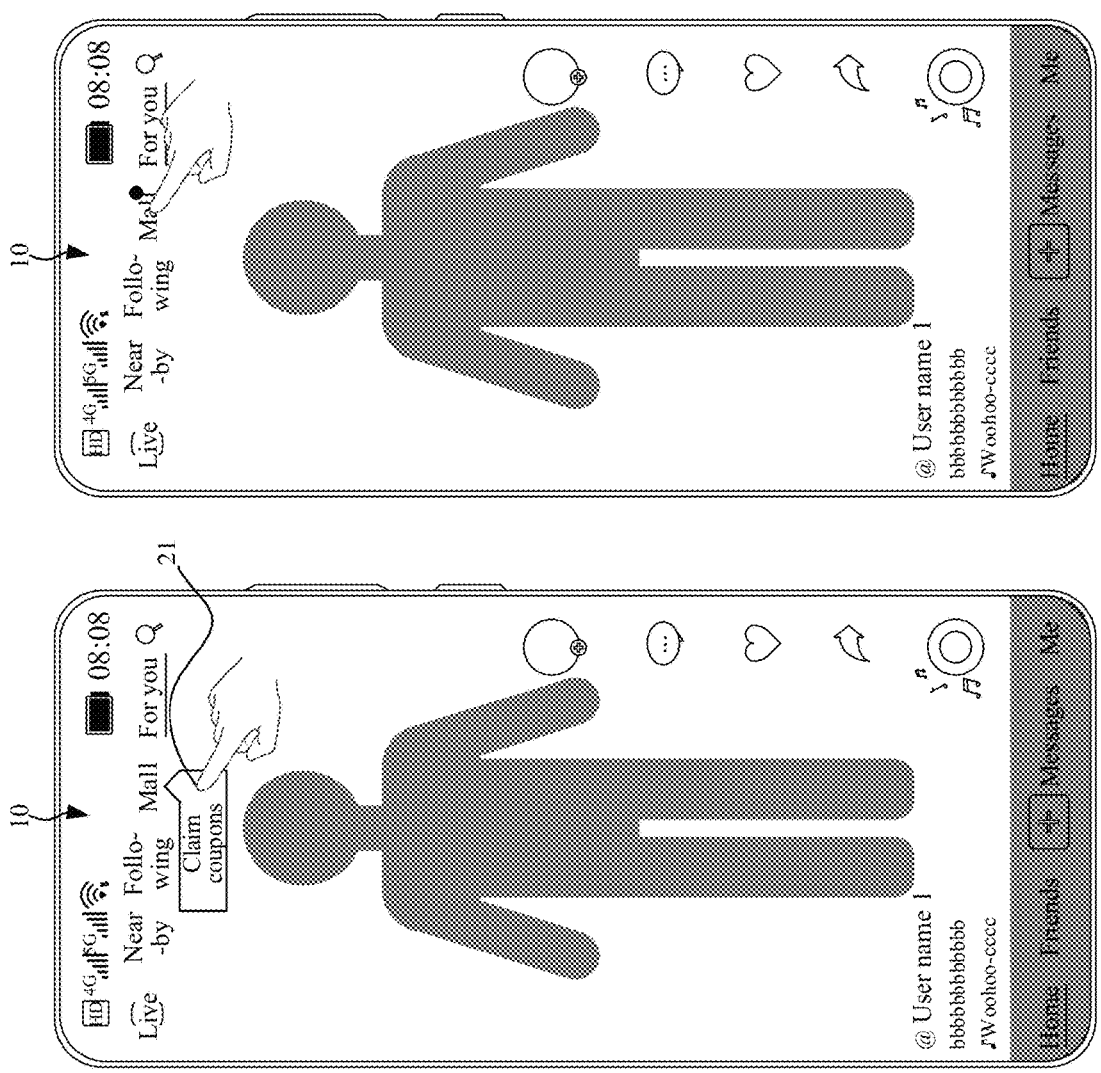
Fig. 3A  Fig. 3B  Fig. 3C

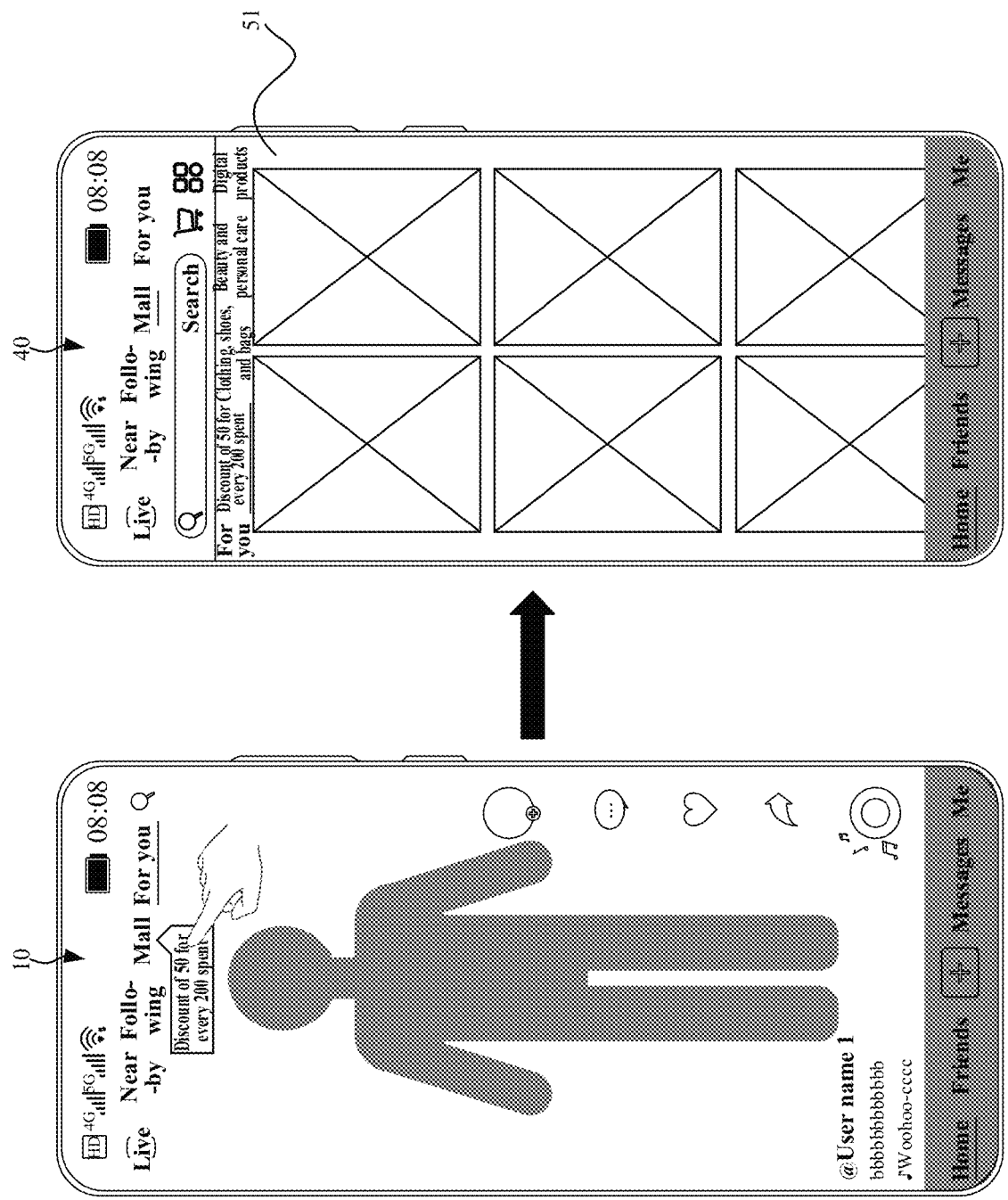

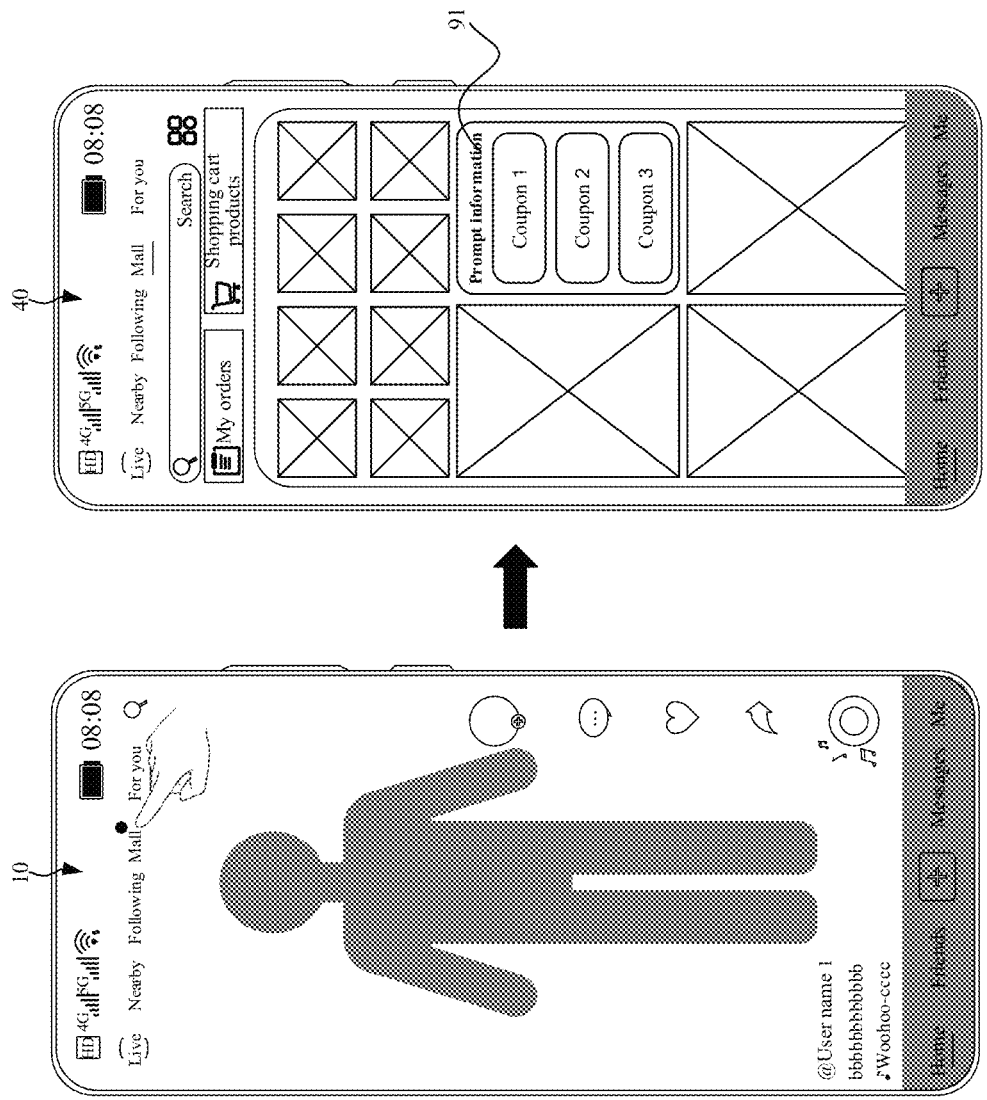

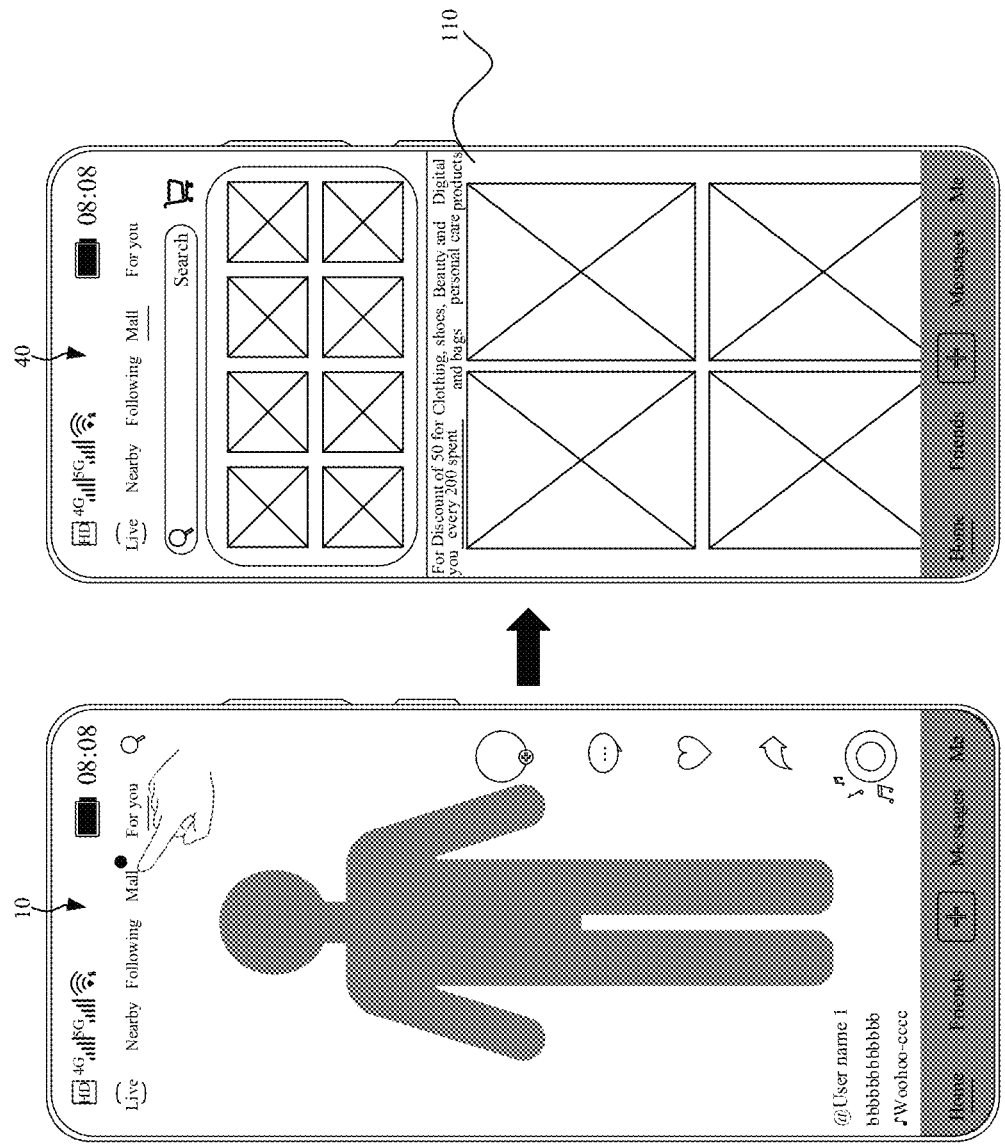

METHOD, APPARATUS, ELECTRONIC DEVICE AND STORAGE MEDIUM FOR GUIDING AND DISPLAYING A RELATED CONTENT

CROSS-REFERENCE TO RELATED APPLICATION(S)

This application claims priority to Chinese Application No. 202310576328.7 filed May 19, 2023, the disclosure of which is incorporated herein by reference in its entity.

FIELD

The disclosure relates to the technical field of human-computer interaction, and in particular to a method, apparatus, an electronic device, and a storage medium for guiding and displaying a related content.

BACKGROUND

Currently, e-commerce applications (Apps) attract users to participate in various transaction activities, such as marketing discount activities, mainly by displaying activity information in the form of status bar pop-up windows or highlighted reminders on relevant pages. If the users clear the status bar pop-up windows or exit the relevant pages due to misoperation, the activity information will no longer be displayed, and as a result, it is difficult to guide the users to detail pages of transaction scenarios to participate in the activities, leading to a poor guidance effect. Therefore, how to diversely guide participation in the transaction activities and improve the guidance effect is a technical problem that urgently needs to be solved.

SUMMARY

In order to solve the above technical problems, or at least partially solve the above technical problems, the disclosure provides a method, apparatus, an electronic device, and a storage medium for guiding and displaying a related content, which can attract users to participate in transaction activities in diversified forms, increase the possibility of the users participating in the transaction activities, and improve a guidance effect.

In a first aspect, the disclosure provides a method for guiding and displaying a related content. The method includes:
  displaying a target page, where the target page displays first guidance information corresponding to a target tag, and the first guidance information is used for guiding a user to perform a target event corresponding to the target tag;
  displaying a transaction scenario page corresponding to the target tag in response to detecting a trigger instruction for the target event corresponding to the target tag, and a trigger duration of the trigger instruction satisfies a first condition, where the transaction scenario page corresponding to the target tag displays an event-associated interface corresponding to the target event; and
  displaying a transaction scenario page corresponding to the target tag in response to detecting the trigger instruction for the target event corresponding to the target tag, and the trigger duration of the trigger instruction satisfies a second condition, where the transaction scenario page corresponding to the target tag displays prompt information corresponding to the target event.

In a second aspect, the disclosure provides an apparatus for guiding and displaying a related content. The apparatus includes:
  a display module, configured to display a target page, where the target page displays first guidance information corresponding to a target tag, and the first guidance information is used for guiding a user to perform a target event corresponding to the target tag; and
  a detection module, configured to display a transaction scenario page corresponding to the target tag in response to detecting a trigger instruction for the target event corresponding to the target tag, and a trigger duration of the trigger instruction satisfies a first condition, where the transaction scenario page corresponding to the target tag displays an event-associated interface corresponding to the target event, and
  the detection module is further configured to display a transaction scenario page corresponding to the target tag in response to detecting the trigger instruction for the target event corresponding to the target tag, and the trigger duration of the trigger instruction satisfies a second condition, where the transaction scenario page corresponding to the target tag displays prompt information corresponding to the target event.

In a third aspect, the disclosure provides an electronic device. The electronic device includes: one or more processors, and a storage configured to store one or more programs. The one or more programs, when executed by the one or more processors, enable the one or more processors to implement the above method for guiding and displaying a related content.

In a fourth aspect, the disclosure provides a computer-readable storage medium, storing a computer program. The program, when executed by a processor, implements the above method for guiding and displaying a related content.

Compared with the prior art, the technical solutions provided by the embodiments of the disclosure have the following advantages:
  the disclosure provides the method, apparatus, the electronic device, and the storage medium for guiding and displaying a related content. According to the method, the target page is first displayed, and displays the first guidance information corresponding to the target tag, and the first guidance information is used for guiding the user to execute the target event corresponding to the target tag; when the trigger instruction for the target event is detected and the trigger duration of the trigger instruction satisfies the first condition, the transaction scenario page corresponding to the target tag is displayed, and the event-associated interface corresponding to the target event is displayed on the transaction scenario page; and when the trigger instruction for the target event is detected and the trigger duration of the trigger instruction satisfies the second condition, the transaction scenario page corresponding to the target tag is displayed, and the prompt information corresponding to the target event is displayed on the transaction scenario page. In the disclosure, the first guidance information is displayed on the target page to guide the user, so as to display relevant information of the target event on the transaction scenario page in different forms according to different conditions satisfied by the duration of triggering the target event: the event-associated page or prompt information, thereby attracting the user to participate in the transaction activities in a diversified manner, increasing the possibility of the user participating in the transaction activities, and improving the guidance effect.

BRIEF DESCRIPTION OF THE DRAWINGS

The accompanying drawings herein are incorporated into the specification to form a part of the specification, illustrate embodiments conforming to the disclosure, and are used to explain the principle of the disclosure together with the specification.

In order to describe the technical solutions in the embodiments of the disclosure or in the prior art more clearly, the accompanying drawings required to be used in descriptions of the embodiments or the prior art will be briefly introduced below, and it is apparent that those of ordinary skill in the art can obtain other accompanying drawings according to these accompanying drawings without creative work.

FIG. 3A is a first schematic diagram of a touch instruction according to an embodiment of the disclosure;

FIG. 3B is a second schematic diagram of a touch instruction according to an embodiment of the disclosure;

FIG. 3C is a third schematic diagram of a touch instruction according to an embodiment of the disclosure;

FIGS. 5A-5B are second schematic diagrams of displaying event-associated interfaces according to an embodiment of the disclosure;

FIGS. 9A-9B are first schematic diagrams of prompt information according to an embodiment of the disclosure;

FIGS. 10A-10B are second schematic diagrams of prompt information according to an embodiment of the disclosure;

DETAILED DESCRIPTION OF EMBODIMENTS

In order to gain a clearer understanding of the above objectives, features, and advantages of the disclosure, the solution of the disclosure is further described below. It should be noted that features of the embodiments and implementations in the disclosure can be mutually combined without conflicts.

Many specific details are elaborated in the following description to facilitate a full understanding of the disclosure, but the disclosure may also be implemented in methods different from those described here. Obviously, the embodiments in the specification are only a part rather all of the embodiments of the disclosure.

Figure 1:
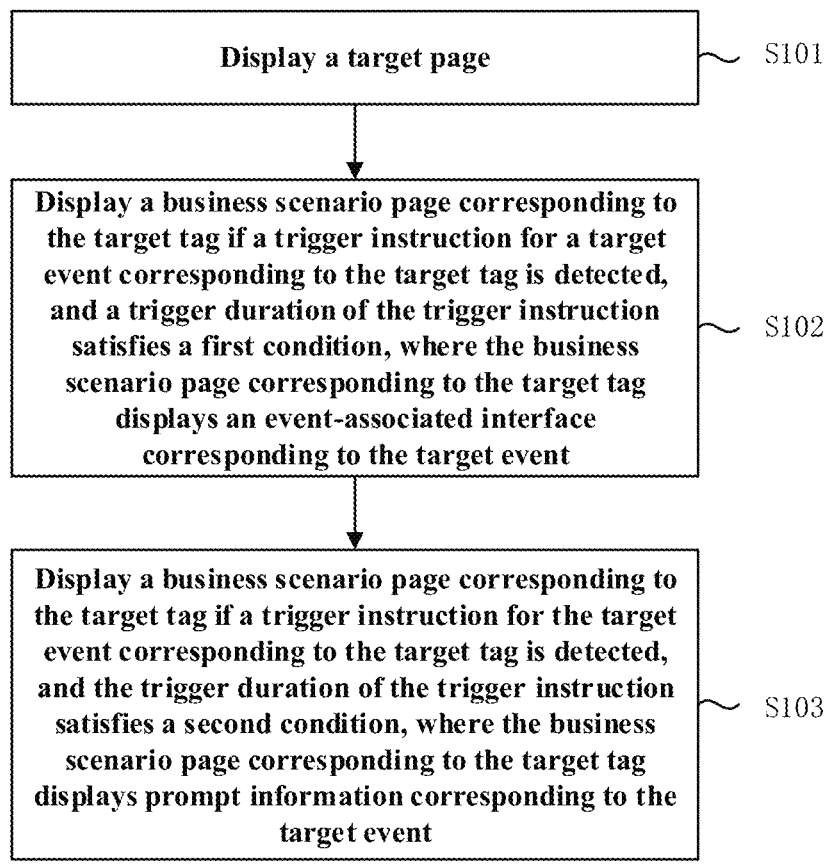
FIG. 1 is a schematic flowchart of a method for guiding and displaying a related content according to an embodiment of the disclosure.

FIG. 1 is a schematic flowchart of a method for guiding and displaying a related content according to an embodiment of the disclosure. As shown in FIG. 1, the method includes the following steps S101 to S103:

S101: a target page is displayed.

The target page displays first guidance information corresponding to a target tag, and the first guidance information is used for guiding a user to perform a target event corresponding to the target tag.

The target page may be a page that guides the user to view and process an object. The object may be a thing displayed to the user. In some embodiments, in the e-commerce scenario, the object may be, for example, a product. Specifically, the object may include purchasable items or services, etc. The object has a plurality of attributes. The attributes of the object may be features inherent to the object due to construction, composition, etc. If the object is an item, the attributes of the object include a name, brand, category, style, size, material, function, trademark, type, price, color, packaging, etc. of the object. If the object is a service, attributes are the content, brand, category, precautions, price, etc., included in the object.

Exemplarily, the target page may be an information feed homepage or a mall homepage. The information feed page may be, for example, a page in an application client used for displaying information feeds in an information feed playback sequence.

The information feed playback sequence is a data format that continuously provides a content to users. The information feed playback sequence includes a set of information/content. The set of information/content includes a plurality of pieces of information/content, sequentially arranged in a specific order to form the information feed playback sequence.

An information feed refers to each piece of information/content within the information feed playback sequence. The information feed playback sequence is a collection formed by a plurality of information feeds. Exemplarily, if the information feed playback sequence is a set of videos, each video is an information feed.

In some embodiments, different information feeds within the same information feed playback sequence may be of the same or different types. The types of information feeds may include, but are not limited to, a live preview video, a live video, a short video, graphic and text information, etc. The live preview video may be, for example, a video used for attracting viewers to a live streaming room. The live video may be, for example, a video that reflects the content currently being broadcast in the live streaming room. The short video may be, for example, a short video clip. The graphic and text information may, for example, recommend some content to the user, such as recommending applications or mini-games on the page.

The mall homepage may be a default or first page displayed after entering a mall. The mall homepage has one of the following functions: guiding users with specific product purchase needs to directly search for specific products;

guiding users with purchase needs for a certain type of product to vaguely search for that type of product; and attracting customers without shopping needs to browse and increase interest in purchasing. It should be noted that the mall homepage may be a homepage corresponding to marketing activities. During various marketing activities, the mall homepage may be, for example, a shopping festival event venue page.

Optionally, the target page is used for playing a target video; and the target video may be a short video, a live preview video, or a live video, etc.

It should be noted that an object corresponding to the target page may be a target object or other objects besides the target object. The target object is thing related to the target event. The target event refers to displaying transaction information related to the target object. The types of transaction information include at least one of the following: a marketing type, an order type, and an equity type.

The transaction information of the marketing type includes, but is not limited to: unclaimed coupons, product information in discount activities, and recharge discount information.

The transaction information of the order type includes, but is not limited to: order detail information, and product attribute update information in a shopping cart/favorites. The order detail information may be, for example, a logistics status update of a product in an order.

The transaction information of the equity type includes, but is not limited to: coupons corresponding to preset account information and off-price product benefit information.

The target page displays a plurality of tags, and the different tags correspond to different display pages. Exemplarily, tags included in the target page are: "Live", "Nearby", "Following", "Mall", "For you", etc.

The target tag is one of a plurality of pre-configured tags. In the e-commerce scenario of this embodiment of the disclosure, based on the need to guide the users to participate in various transaction activities, for example, the target tag may be set as "Mall" to attract the users to purchase and consume. The target tag may be set according to actual needs, which is not specifically limited by the disclosure.

The first guidance information is used for guiding the user to execute the target event corresponding to the target tag. The first guidance information includes at least one of an image of a target object, text description information, and a marker icon. The first guidance information is displayed in an area corresponding to a display area of the target tag on the target page.

In this embodiment of the disclosure, a display form of the first guidance information includes a pop-up window control in the form of a bubble and/or a corner mark. The pop-up window control in the form of the bubble is a pop-up window control that is in an upper layer of the target page and has a transparency distinct from the target page, resembling a bubble. It should be understood that the first guidance information is displayed in the area corresponding to the display area of the target tag with the pop-up window control in the form of the bubble, or displayed, in the form of the corner mark, in the area corresponding to the display area of the target tag, or both the pop-up window control in the form of the bubble and the corner mark are simultaneously displayed in the area corresponding to the display area of the target tag.

Figure 2A:
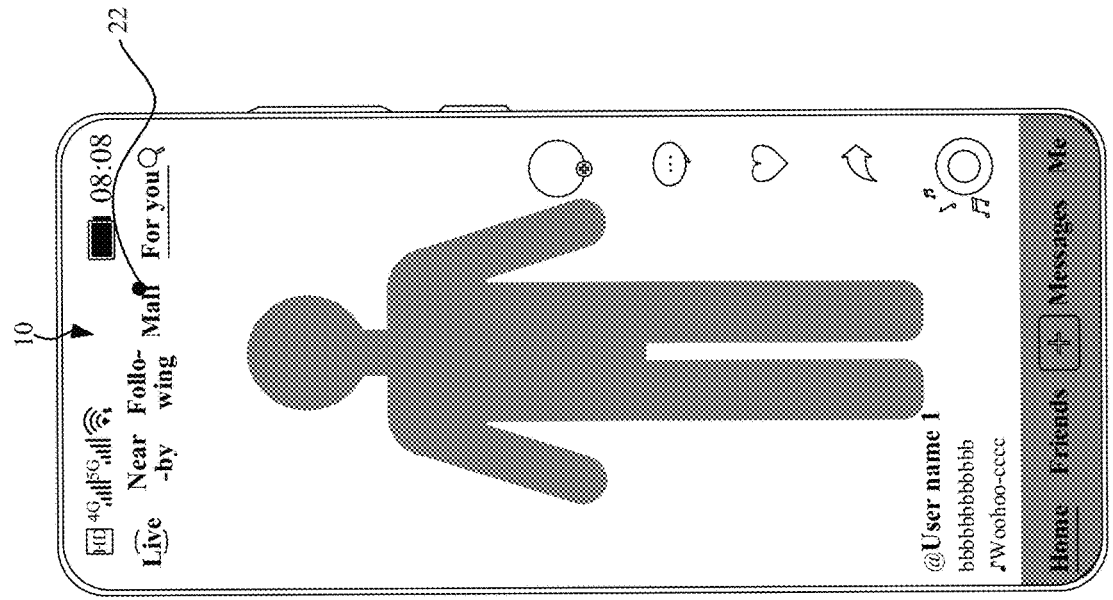
FIG. 2A is a first schematic diagram of displaying guidance information according to an embodiment of the disclosure.

Exemplarily, as shown in FIG. 2A, first guidance information 21 corresponding to a target tag "Mall" is displayed in a target page 10, and includes text description information of the target object, with the content "Claim coupons". The first guidance information 21 is displayed, with a pop-up window control in the form of a bubble, nearby the target tag "Mall" (below "Mall" in FIG. 2A) and points to the target tag "Mall".

Figure 2B:
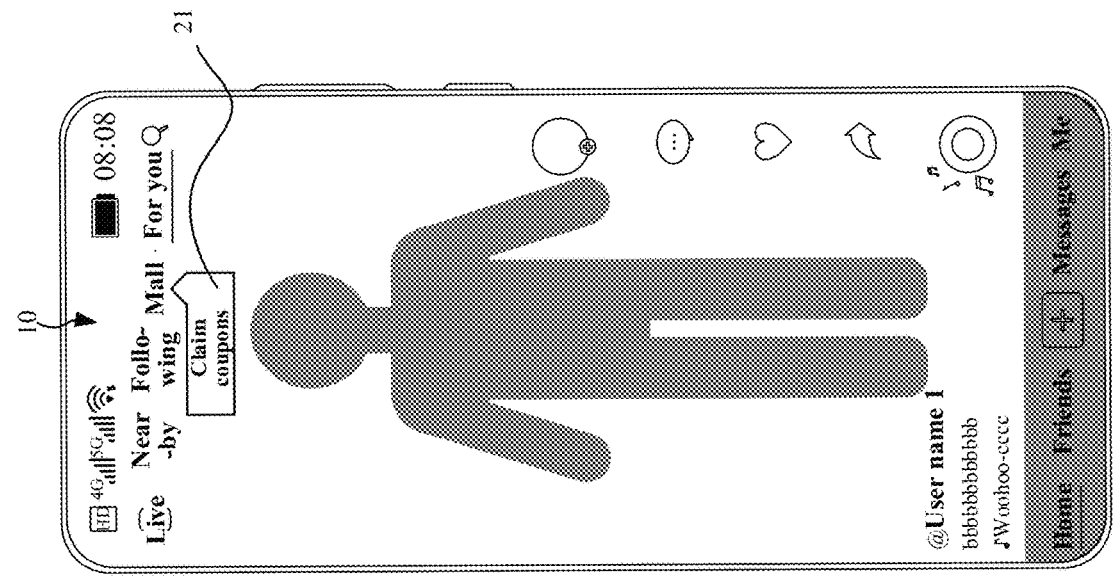
FIG. 2B is a second schematic diagram of displaying guidance information according to an embodiment of the disclosure.

Again exemplarily, as shown in FIG. 2B, the target page 10 displays first guidance information 22 corresponding to the target tag "Mall". The first guidance information does not include an image or text description information of the target object but only includes a corner mark. In FIG. 2B, the corner mark is circular and is located near the target tag "Mall", such as, in an upper right corner of "Mall".

In some embodiments, there is a form replacement duration corresponding to the first guidance information, and a form replacement duration threshold is preset to measure whether to change the display form of the first guidance information. For example, the form replacement duration threshold is 3 s or 5 s, etc. The disclosure does not specifically limit the form replacement duration threshold.

Exemplarily, the first guidance information 21 is first displayed in a display form shown in FIG. 2A. When the display duration of the first guidance information 21 reaches the form replacement duration threshold, a display form shown in FIG. 2B is adopted through switchover to display the first guidance information 22. Compared with the display form shown in FIG. 2A, a display area of the display form shown in FIG. 2B is small. Displaying is performed in the display form shown in FIG. 2B after the display duration threshold is exceeded, so as to avoid obstructing the target page and reduce disturbance on the user.

In some embodiments, the first guidance information is correspondingly configured with pop-up conditions. When the pop-up conditions configured corresponding to the first guidance information are met, the first guidance information is displayed on the target page. The pop-up conditions include at least one of the following: (1) current time is within a display time range corresponding to the first guidance information; (2) account information matches a target event; (3) a display frequency of the first guidance information is less than a preset frequency; and (4) the first guidance information has the highest priority among guidance information to be displayed.

When the target page is displayed, whether the current time falls within the display time range corresponding to the first guidance information may be determined. The display time range corresponding to the first guidance information is preset and associated with transaction information related to the target object. For example, when the transaction information involves unclaimed coupons, the display time range corresponding to the first guidance information is set from x month/x day/x hour/x minute/x second to y month/y day/y hour/y minute/y second. The display time range may be adjusted according to actual transaction information needs, which is not specifically limited by the disclosure. When the current time falls within the display time range corresponding to the first guidance information, the first guidance information pops up on the target page for display. The display time for the guidance information is flexibly configured, and guidance is performed within a specific time period to adapt to the target event and improve the guidance effect.

When the target page is displayed, whether the account information matches the target event may also be determined. The account information refers to login account information for an application. Optionally, whether an account indicated by the account information meets conditions to participate in the target event is determined. Exemplarily, if the target event is to display newcomer coupons, whether the account indicated by the account information is a newly registered account is determined. If yes, the first guidance information pops up on the target page to guide the newcomer user to claim the newcomer coupons. Targeted guidance for specific groups of people is achieved so as to improve the guidance effect.

When the target page is displayed, whether the display frequency of the first guidance information is less than the preset frequency may also be determined. The preset frequency is the preset maximum display frequency for the first guidance information. A preset frequency setting form may be a maximum number of display times within a preset time, such as n times per day (n is a positive integer), or a maximum total number of times. When the display frequency of the first guidance information is less than the preset display frequency, the first guidance information pops up on the target page for display, thereby avoiding the interference to the user caused by frequent popup of the first guidance information, and improving user experience while ensuring the guidance effect.

In some embodiments, there is a priority among transaction information corresponding to the target event. For example, the priority of the transaction information may be set as: marketing type>equity type>order type. Furthermore, for transaction information of the marketing type, the priority is set as: unclaimed coupons>product information in discount activities>recharge discount information. Accordingly, each transaction information corresponds to different guidance information to be displayed, and the priority of each guidance information to be displayed varies. This is merely an exemplary illustration, and the disclosure does not specifically limit the priority setting of the transaction information.

Further, when the target page is displayed, the priorities of the guidance information to be displayed are compared, and the first guidance information with the highest priority is determined from the guidance information to be displayed and pops up on the target page. For example, if the guidance information to be displayed (illustrated here using text description information included in the guidance information to be displayed) includes: claim coupons, discount of 50 for every 200 spent, and instant discount on recharge, the priority is: claim coupons>discount of 50 for every 200 spent> instant discount on recharge, and then the highest priority "claim coupons" is determined to pop up to be displayed on the target page. Therefore, the first guidance information with a highest importance degree is preferably displayed, so as to achieve a better guidance effect.

In the above embodiments, when the target page is displayed, conditional judgments are made on whether to pop up the first guidance information, thereby preferably displaying the first guidance information with the highest importance degree to a specific user with a specific frequency at a specific time, and improving the guidance effect of the first guidance information.

S102: if a trigger instruction for the target event corresponding to the target tag is detected, and a trigger duration of the trigger instruction satisfies a first condition, a transaction scenario page corresponding to the target tag is displayed, and the transaction scenario page corresponding to the target tag displays an event-associated interface corresponding to the target event.

The trigger instruction for the target event includes, but is not limited to, at least one of the following: a tap touch instruction for the first guidance information, a tap touch instruction for the target tag, and a swipe touch instruction for a current tag on the target page. The swipe touch instruction indicates a swipe from the current tag to the target tag.

In some embodiments, both the first guidance information and the target tag are operable controls on the target page. The tap touch instruction for the first guidance information is an instruction generated by the operation of the user in tapping on the first guidance information. The tap touch instruction for the target tag is an instruction generated by the user tapping on the target tag. The swipe touch instruction for the current tag is an instruction generated by the operation of the user in swipe switchover from the current and non-target tag to the target tag.

Exemplarily, as shown in FIG. 3A, when the user taps on the first guidance information 21 displayed on the target page 10, it is determined that the trigger instruction for the target event corresponding to the target tag is detected. As shown in FIG. 3B, when the user taps on the target tag "Mall" displayed on the target page 10, it is determined that the trigger instruction for the target event corresponding to the target tag is detected. As shown in FIG. 3C, when the user performs a swipe operation (a right swipe in FIG. 3C) for the current tag "For you" on the target page 10 to achieve swipe switchover from the current tag "For you" to the target tag "Mall", it is determined that the trigger instruction for the target event corresponding to the target tag is detected.

A trigger duration of the trigger instruction refers to a duration from the time when the first guidance information starts to be displayed to the time when the trigger instruction is detected.

Exemplarily, the trigger duration of the trigger instruction refers to the duration from the time when the first guidance information 21 corresponding to the target tag is displayed in FIG. 2A to the time when the tap touch instruction for the guidance information is detected in FIG. 3A. Alternatively, the trigger duration of the trigger instruction refers to a duration from the time when the first guidance information 21 corresponding to the target tag is displayed in FIG. 2A to the time when the tap touch instruction for the target tag is detected in FIG. 3B. Alternatively, the trigger duration of the trigger instruction refers to a duration from the time when the first guidance information 21 corresponding to the target tag is displayed in FIG. 2A to the time when the swipe touch instruction for the current tag is detected in FIG. 3C. The first guidance information is initially displayed with the pop-up window control in the form of the bubble.

Again exemplarily, the trigger duration of the trigger instruction refers to a duration from the time when the first guidance information 22 corresponding to the target tag is displayed in FIG. 2B to the time when the tap touch instruction for the target tag is detected in FIG. 3B, or refers to a duration from the time when the first guidance information 22 corresponding to the target tag is displayed in FIG. 2B to the time when the swipe touch instruction for the current tag is detected in FIG. 3C, where the first guidance information is initially displayed in the form of a marker icon.

The first condition is that the trigger duration of the trigger instruction is less than or equal to a first preset duration. The first preset duration is a preset trigger valid duration. If the trigger instruction is detected within the first preset duration, it is considered that the user has a strong interest in the target event. If the trigger instruction is detected beyond the first preset duration, it is considered that the user has some interest in the target event, but the level of interest is not high. In the embodiments of the disclosure, the first preset duration may be set to 10 s, which is not specifically limited.

The transaction scenario page corresponding to the target tag may be the mall homepage or event venue homepage. It should be understood that during various transaction activities, the name of the transaction scenario page may change. Exemplarily, the event venue homepage may be called a homepage of a New Year's Goods Festival or a Shopping Festival.

The event-associated interface corresponding to the target event displays transaction information related to the target object. The event-associated interface includes, but is not limited to, an interface including options for unclaimed coupons, an interface including products in discount activities, an interface including recharge discount information, an interface including order detail information for the target object, an interface including attribute update information for the target object, and an interface including equity information corresponding to a preset user.

In some embodiments, if the trigger instruction for the target event corresponding to the target tag is detected, and the duration of the trigger instruction satisfies the first condition, it indicates that the user triggers the target tag or guidance information within the short time of displaying the guidance information of the target tag, indicating that the user has a strong interest in the target event. Therefore, the transaction scenario page corresponding to the target tag is displayed, and the event-associated interface corresponding to the target event is displayed on that transaction scenario page. Highly relevant content is rapidly fed back to the user: displaying the event-associated interface corresponding to the target event on the transaction scenario page so as to attract the user to participate in the target event in the e-commerce scenario and stimulate shopping and consumption.

In some embodiments, the display method for the event-associated interface corresponding to the target event on the transaction scenario page corresponding to the target tag includes at least one of the following: displaying the event-associated interface corresponding to the target event in the form of a pop-up window on the transaction scenario page corresponding to the target tag; anchoring to the event-associated interface corresponding to the target event on the transaction scenario page corresponding to the target tag, where the event-associated interface corresponding to the target event is a part of interface on the transaction scenario page corresponding to the target tag; and pulling up and displaying the event-associated interface corresponding to the target event on the transaction scenario page corresponding to the target tag, where the display area of the event-associated interface corresponding to the target event is smaller than the display area of the transaction scenario page.

The following describes the display method for the event-associated interface corresponding to the target event on the transaction scenario page corresponding to the target tag respectively from the marking type, the order type, and the equity type according to transaction information corresponding to target events of different types:

(1) Marketing Type

As mentioned earlier, the transaction information of the marketing type may include: unclaimed coupons, product information in discount activities, and recharge discount information. The event-associated interface corresponding to the target event is an interface including options for unclaimed coupons, or an interface including products in discount activities, or an interface including recharge discount information.

A. Unclaimed Coupons

Figures 4A, 4B:
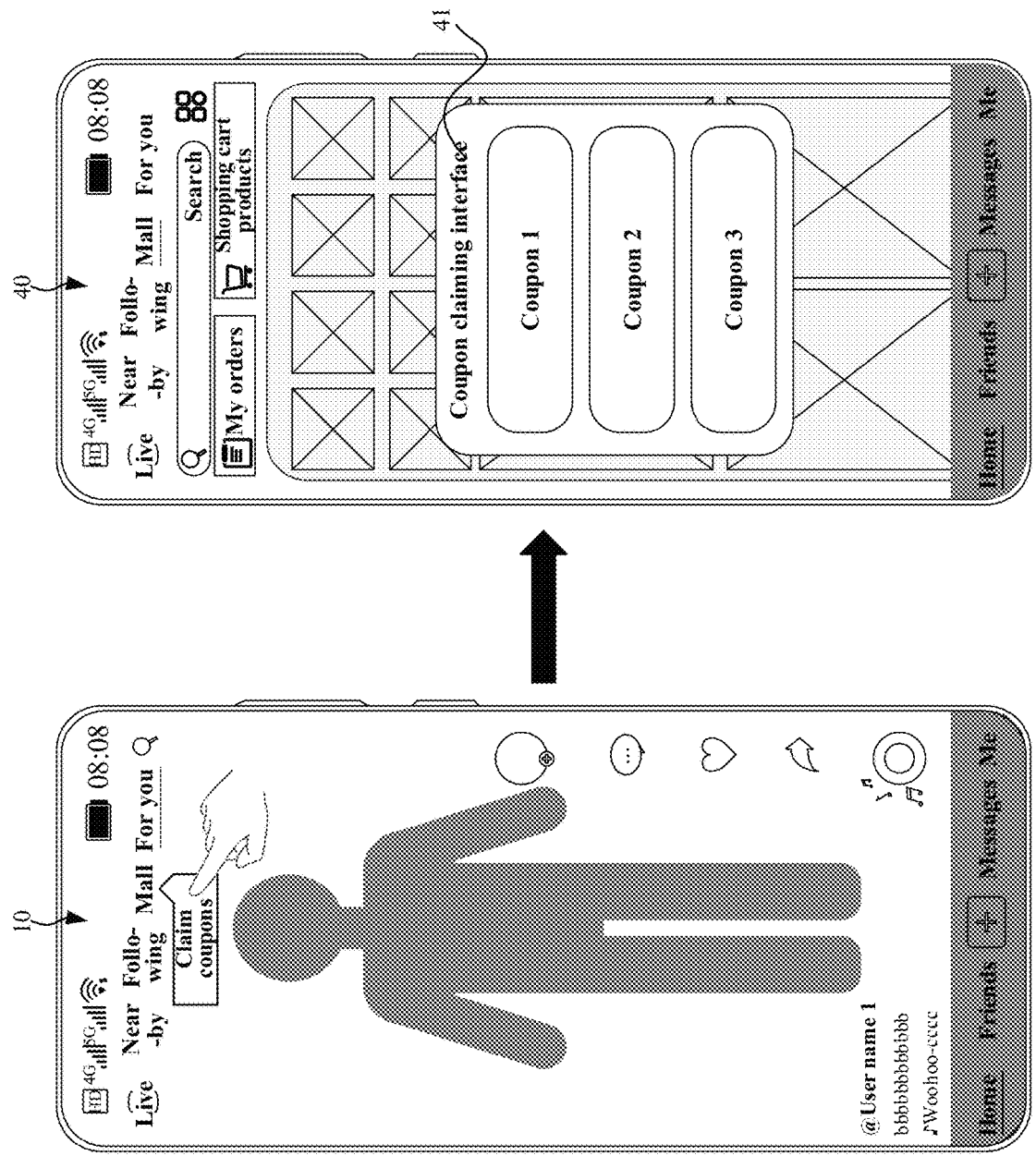
FIGS. 4A-4B are first schematic diagrams of displaying event-associated interfaces according to an embodiment of the disclosure.

In some embodiments, when the transaction information of the marketing type includes the unclaimed coupons, the first guidance information is specifically used for guiding the user to claim the coupons. As shown in FIG. 4A, the content of text description information included in the first guidance information includes: claim coupons. If the trigger instruction for the target event corresponding to the target tag is detected, and the trigger duration of the trigger instruction satisfies the first condition, it indicates that the user triggers the target tag or guidance information within the first preset duration (detecting the tap touch instruction for the first guidance information in FIG. 4A), indicating that the user has a strong interest in the activity of claiming coupons and expects to claim the coupons. Therefore, as shown in the FIG. 4B, a transaction scenario page 40 corresponding to the target tag is displayed, an event-associated interface 41 (a coupon claiming interface in FIG. 4B) corresponding to the target event is displayed on the transaction scenario page 40 in the form of a pop-up window, and the coupon claiming interface includes options for the unclaimed coupons.

B. Product Information in Discount Activities

In some embodiments, when the transaction information of the marketing type includes the product information in discount activities, the first guidance information is specifically used for guiding the user to browse products in discount activities. As shown in FIG. 5A, text description information included in the first guidance information includes: discounting 50 for every 200 spent. If the trigger instruction for the target event corresponding to the target tag is detected, and the trigger duration of the trigger instruction satisfies the first condition, it indicates that the user triggers the target tag or guidance information within the first preset duration (detecting the tap touch instruction for the first guidance information in FIG. 5A). As shown in the FIG. 5B, the transaction scenario page 40 corresponding to the target tag is displayed.

Optionally, the transaction scenario page 40 includes a target tag, at least one sub-tag under the target tag, and an event-associated interface 51 corresponding to a target event anchored to the first sub-tag, where the first sub-tag is a sub-tag that corresponds to the transaction information (product information in discount activities) from the at least one sub-tag. The event-associated interface 51 corresponding to the target event is a part of interface within the transaction scenario page 40.

Therefore, anchoring to the event-associated interface 51 corresponding to the target event within the transaction scenario page 40 is performed. The event-associated interface 51 includes card areas corresponding to a plurality of products in marketing activities.

Exemplarily, as shown in FIG. 5B, the transaction scenario page 40 includes a target tag "Mall", at least one sub-tag under the target tag "Mall": "For you", "Discount 50 for every 200 spent", "Clothing, Shoes, and Bags", "Beauty and Personal Care", "Digital Products", etc., as well as the event-associated interface 51 under the first sub-tag "Discount 50 for every 200 spent" corresponding to the discount activities. The event-associated interface 51 is displayed below the at least one sub-tag, with the at least one sub-tag displayed at the top, and the event-associated interface 51 is a part of interface within the transaction scenario page 40. This is merely an exemplary illustration, and the disclosure does not specifically limit the number and name of the at least one sub-tag.

C. Recharge Discount Information

Figures 6A, 6B:
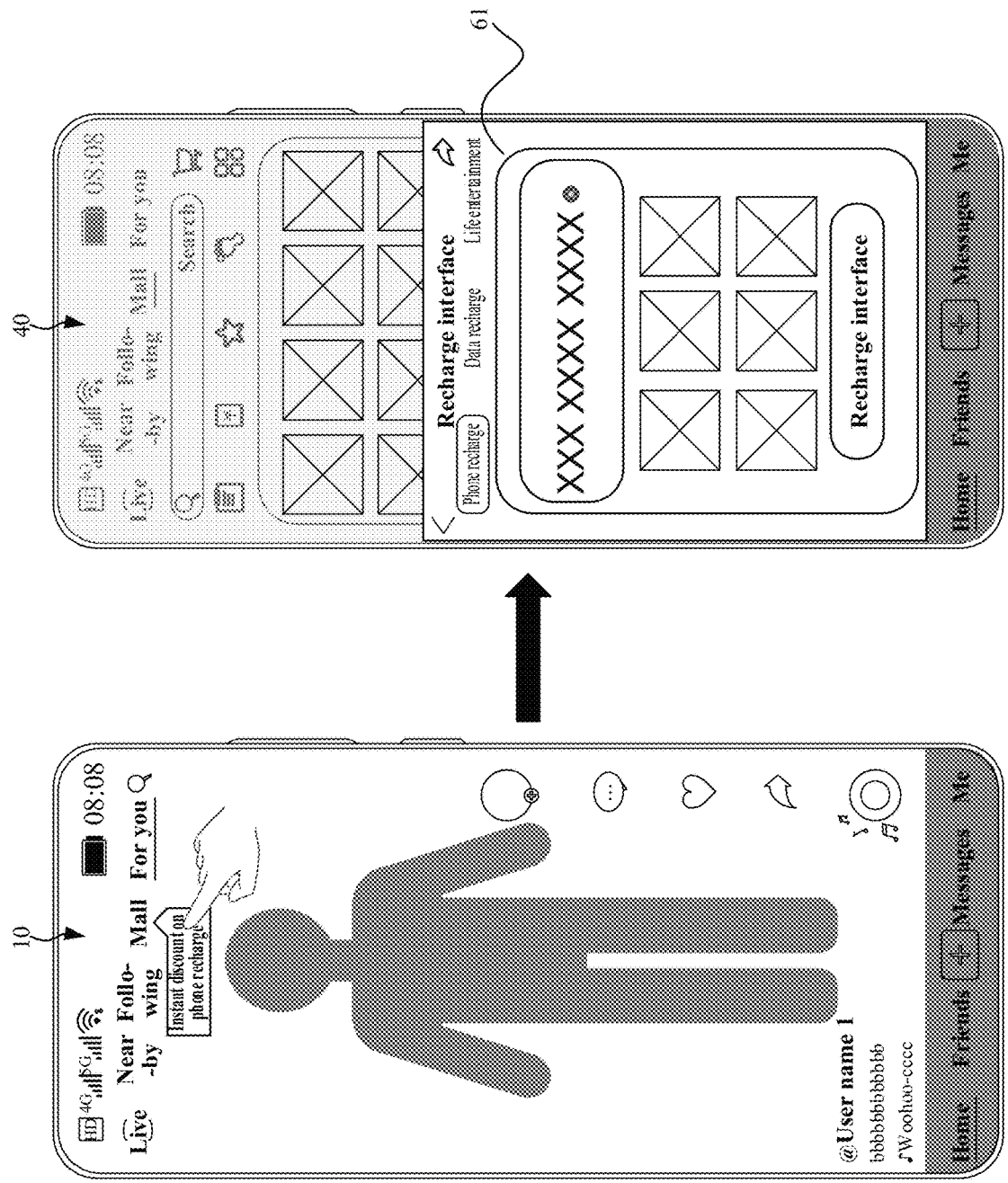
FIGS. 6A-6B are third schematic diagrams of displaying event-associated interfaces according to an embodiment of the disclosure.

In some embodiments, when the transaction information of the marketing type includes the recharge discount information, the first guidance information is specifically used for guiding the user to recharge. As shown in FIG. 6A, the content of text description information included in the first guidance information includes: instant discount on phone recharge. If the trigger instruction for the target event corresponding to the target tag is detected, and the trigger duration of the trigger instruction satisfies the first condition, it indicates that the user triggers the target tag or guidance information within the first preset duration (detecting the tap touch instruction for the first guidance information in FIG. 6A), indicating that the user has a strong interest in the recharge discount activity and expects to recharge. As shown in the FIG. 6B, the transaction scenario page 40 corresponding to the target tag is displayed, and a recharge interface 61 (an event-associated interface) is pulled up within the transaction scenario page, and the display area of the event-associated interface is smaller than that of the transaction scenario page. The recharge interface 61 includes recharge discount activity information.

Exemplarily, as shown in FIG. 6B, the seven-screen recharge interface 61 is directly pulled up within the transaction scenario page 40 (the mall homepage). The recharge interface 61 may include, for example, options for recharge targets and recharge amounts.

(2) Order Type

As mentioned earlier, the transaction information of the order type may include: order detail information, and product attribute update information in a shopping cart/favorites. The event-associated interface corresponding to the target event is an interface including the order detail information of the target object, or an interface including attribute update information of the target object.

A. Order Detail Information

Figures 7A, 7B:
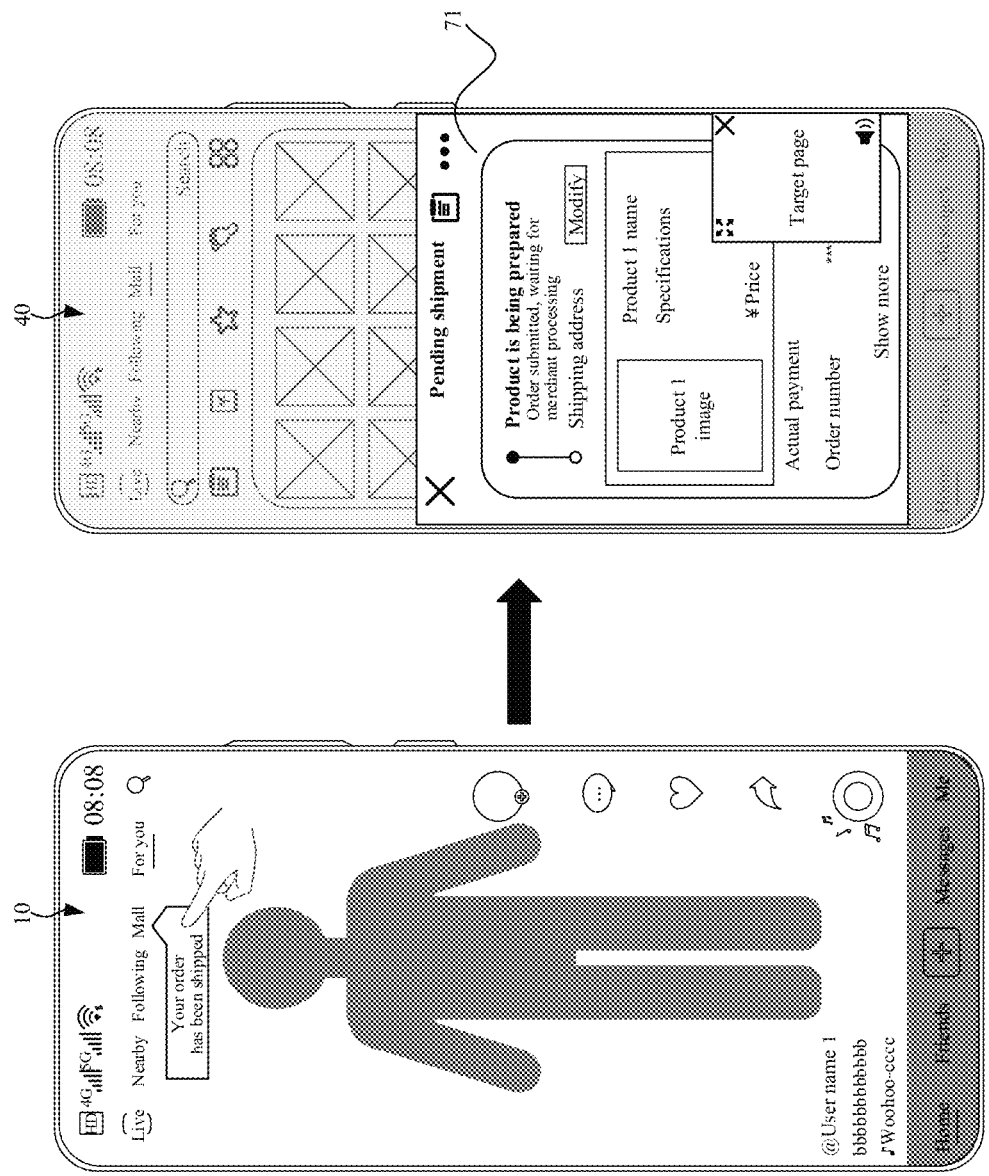
FIGS. 7A-7B are fourth schematic diagrams of displaying event-associated interfaces according to an embodiment of the disclosure.

In some embodiments, when the transaction information of the marketing type includes the order detail information, the first guidance information is specifically used for guiding the user to view status information of the target object. As shown in FIG. 7A, the content of text description information included in the first guidance information includes: your order has been shipped. If the trigger instruction for the target event corresponding to the target tag is detected, and the trigger duration of the trigger instruction satisfies the first condition, it indicates that the user triggers the target tag or guidance information within the preset duration (detecting the tap touch instruction for the first guidance information in FIG. 7A), indicating that the user has a strong interest in the order status update and expects to view the latest status of the target object in the order. As shown in the FIG. 7B, the transaction scenario page 40 corresponding to the target tag is displayed, and an event-associated interface corresponding to the target event is displayed on the transaction scenario page. The target event is the order status update, the event-associated interface is an order detail interface, and the order detail interface includes the order detail information of the target object.

Exemplarily, as shown in FIG. 7B, a seven-screen order detail interface 71 is directly pulled up within the transaction scenario page 40. The order detail interface 71 includes the order detail information of the target object. For example, if a product 1 (the target object) has been shipped, the latest logistics status information for the product 1 is displayed in the order detail interface 71.

B. Product Attribute Update Information in a Shopping Cart/Favorites

Figure 8A:
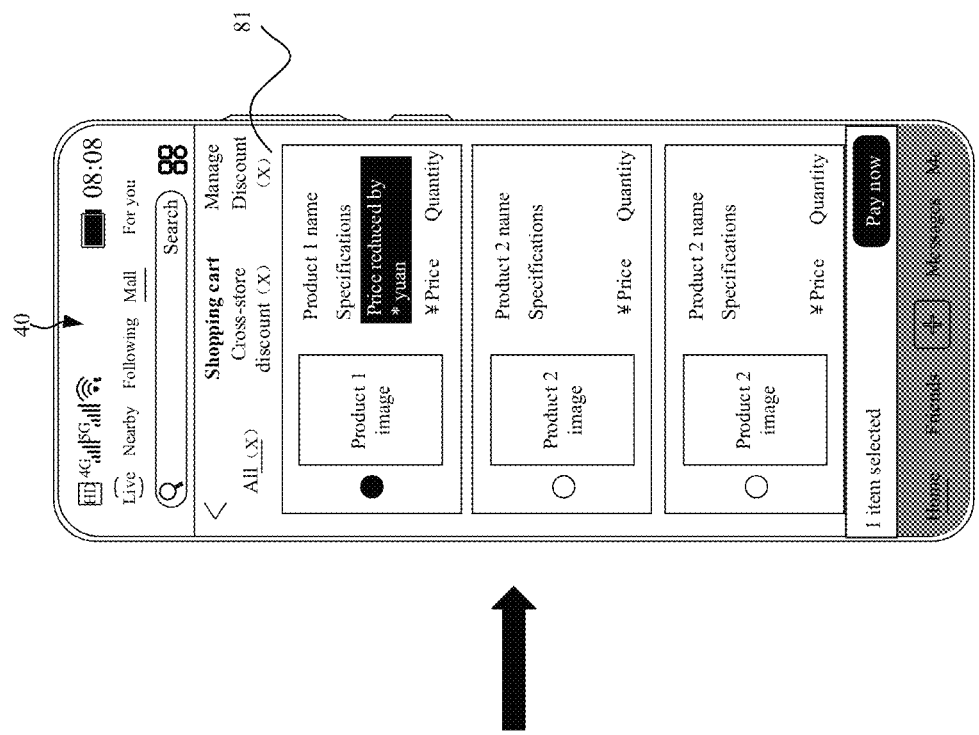
FIGS. 8A-8B are fifth schematic diagrams of displaying event-associated interfaces according to an embodiment of the disclosure.
Figure 8B:
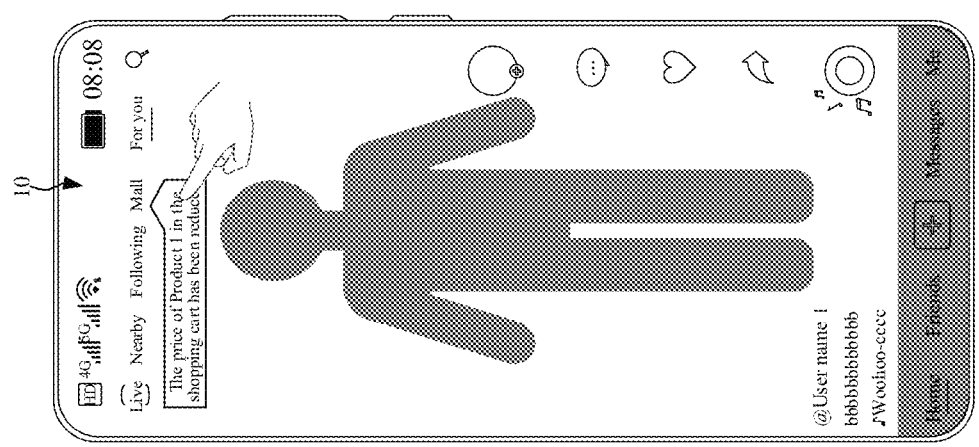

In some embodiments, when the transaction information of the marketing type includes the product attribute update information in the shopping cart/favorites, the first guidance information is specifically used for guiding the user to view updated product attributes in the shopping cart/favorites. As shown in FIG. 8A, the content of text description information included in the first guidance information includes: price drop for the product 1 in the shopping cart. If the trigger instruction for the target event corresponding to the target tag is detected, and the trigger duration of the trigger instruction satisfies the first condition, it indicates that the user triggers the target tag or guidance information within the first preset duration (detecting the tap touch instruction for the first guidance information in FIG. 8A), indicating that the user has a strong interest in product attribute update and expects to view the product with the updated attributes. As shown in the FIG. 8B, the transaction scenario page 40 corresponding to the target tag is displayed, and the shopping cart/favorites 81 is displayed on the transaction scenario page, and includes the target object (the product 1) with the updated product attributes. Therefore, the user is guided to process the target object with the updated product attributes, such as purchasing the target object, thereby achieving the purpose of stimulating consumption.

(3) Equity Type

As mentioned earlier, the transaction information of the equity type may include: coupons corresponding to preset account information and off-price product benefit information. The event-associated interface corresponding to the target event is an interface including equity information corresponding to a preset user.

A. Coupons Corresponding to Preset Account Information

In some embodiments, when the transaction information of the marketing type includes the coupons corresponding to the preset account information, the first guidance information is specifically used for guiding the user indicated by the preset account information to claim the coupons. Text description information included in the first guidance information includes: you have new user coupons waiting to be claimed.

If the trigger instruction for the target event corresponding to the target tag is detected, and the trigger duration of the trigger instruction satisfies the first condition, the tap touch instruction for the first guidance information may be detected within the first preset duration, indicating that the user has a strong interest in new user benefits and expects to claim the new user coupons. Therefore, the transaction scenario page corresponding to the target tag is displayed, the event-associated interface corresponding to the target event is displayed on the transaction scenario page in the form of a pop-up window, and the event-associated interface may include options for coupons corresponding to the preset account information.

B. Off-Price Product Benefit Information

In some embodiments, when the transaction information of the marketing type includes the off-price product benefit information, the first guidance information is specifically used for guiding the user to view off-price products. Text description information included in the first guidance information may be, for example, off-price products.

If the trigger instruction for the target event corresponding to the target tag is detected, and the trigger duration of the trigger instruction satisfies the first condition, for example, the tap touch instruction of the user for the first guidance information may be detected within the first preset duration, indicating that the user is interested in off-price products. Therefore, the transaction scenario page corresponding to the target tag is displayed, anchoring to the event-associated interface, such as an off-price product interface corresponding to the target event on the transaction scenario page is performed, and therefore part of off-price products are displayed on the transaction scenario page.

Based on the above embodiments, optionally, a scaled target page may also be displayed on the transaction scenario page. Exemplarily, as shown in FIG. 7B, the target page is displayed at an upper layer of the event-associated interface in the form of a floating window, thereby guiding the user to participate in the transaction activities while not interrupting the viewing of the user on the target page, and improving use experience of the user. It should be emphasized that the target page in the form of the floating window may be displayed in any area of the transaction scenario page, supporting the user to operate the display position and size of the target page, cancel the display of the target page, and control the volume of the target page, etc., which is not limited by the disclosure.

In the above embodiments, if the trigger instruction for the target event corresponding to the target tag is detected, and the duration of the trigger instruction satisfies the first condition, it indicates that the user has a strong interest in the target event and expects to be guided to execute the target event. Therefore, in the disclosure, the event-associated interface corresponding to the target event is synchronously displayed in a display form strongly related to the target event on the transaction scenario page corresponding to the displayed target tag, thereby achieving a strong hint for the target event, avoiding the need for the user to perform multiple operations on the page and switch multiple times to enter the final event-associated interface, and simplifying the operation. Based on the strong interest of the user, the user is guided to quickly participate in the target event, thereby improving use experience of the user.

S103: if the trigger instruction for the target event corresponding to the target tag is detected, and the trigger duration of the trigger instruction satisfies a second condition, a transaction scenario page corresponding to the target tag is displayed, and the transaction scenario page corresponding to the target tag displays prompt information corresponding to the target event.

The second condition is that the trigger duration is greater than a preset duration. The first preset duration, as mentioned earlier, is the preset trigger valid duration.

In some embodiments, the display method for the prompt information corresponding to the target event on the transaction scenario page corresponding to the target tag includes at least one of the following: displaying the prompt information corresponding to the target event in the form of a card in a preset card display area of the transaction scenario page corresponding to the target tag; anchoring to a target sub-tag on the transaction scenario page corresponding to the target tag, and displaying a transaction content corresponding to the target sub-tag, where the target sub-tag is a tag corresponding to transaction information related to the target object; and displaying second guidance information at a corresponding display position of a target control on the transaction scenario page corresponding to the target tag, where both the target control and the second guidance information are determined according to the transaction information related to the target object.

In some embodiments, if the trigger instruction for the target event corresponding to the target tag is detected, and the trigger duration of the trigger instruction satisfies the second condition, it indicates that the user triggers the target tag or guidance information after the display duration of the target tag is exceeded, indicating that the user is interested in the target event but has a low level of interest. Therefore, the transaction scenario page corresponding to the target tag is displayed, and the prompt information corresponding to the target event is further displayed on the transaction scenario page so as to pre-prompt the user, and guide the user to participate in the target event activities.

The following describes the display method for the prompt information corresponding to the target event on the transaction scenario page corresponding to the target tag respectively from the marking type, the order type, and the equity type according to transaction information corresponding to target events of different types:

(1) Marketing Type

As mentioned earlier, the transaction information of the marketing type may include: unclaimed coupons, product information in discount activities, and recharge discount information.

Accordingly, the prompt information corresponding to the target event may be displayed on the transaction scenario page in the form of a card; the prompt information corresponding to the target event may be a transaction content corresponding to the target tag (discount) anchored to the transaction scenario page; and the prompt information corresponding to the target event may be the second guidance information displayed at the corresponding display position of the target control on the transaction scenario page.

A. Unclaimed Coupons

In some embodiments, when the transaction information of the marketing type includes the unclaimed coupons, the first guidance information is specifically used for guiding the user to claim the coupons. As shown in FIG. 9A, the first guidance information is displayed nearby (upper right corner) of the target tag "Mall" in the form of a corner mark. If the trigger instruction for the target event corresponding to the target tag is detected, and the trigger duration of the trigger instruction satisfies the second condition, it indicates that the user triggers the target tag or guidance information after the first preset duration is exceeded (detecting the tap touch instruction for the target tag in FIG. 9A), indicating that the user may be interested in the activity of claiming coupons but has a low level of interest. In order to achieve the purpose of guiding the user to participate in the target event, as shown in the FIG. 9B, the transaction scenario page 40 corresponding to the target tag is displayed, prompt information 91 corresponding to the target event is displayed on the transaction scenario page 40, and the prompt information 91 is displayed in a preset card display area on the transaction scenario page 40 in the form of a card.

Exemplarily, as shown in FIG. 9B, the transaction scenario page 40 (the mall homepage) is displayed, and the prompt information 91 is displayed in the preset card display area on transaction scenario page 40 in the form of the card. The prompt information 91 includes options for unclaimed coupons. Therefore, without disturbing the user from viewing the transaction scenario page 40, the user is continuously attracted to claim the coupons, and is provided with options to claim the coupons, thereby increasing the possibility of participation.

B. Product Information in Discount Activities

In some embodiments, when the transaction information of the marketing type includes the product information in discount activities, the first guidance information is specifically used for guiding the user to browse products in discount activities. As shown in FIG. 10A, the first guidance information is displayed nearby (upper right corner) of the target tag "Mall" in the form of a corner mark. If the trigger instruction for the target event corresponding to the target tag is detected, and the trigger duration of the trigger instruction satisfies the second condition, it indicates that the first user triggers the target tag or the first guidance information after the preset duration is exceeded (detecting the tap touch instruction for the target tag in FIG. 10A), indicating that the user may be interested in discount but has a low level of interest. In order to achieve the purpose of guiding the user to participate in the discount activities, as shown in the FIG. 10B, the transaction scenario page 40 corresponding to the target tag is displayed.

Optionally, the transaction scenario page 40 includes a target tag, at least one sub-tag under the target tag, and prompt information 110 corresponding to the target event anchored to the target sub-tag, where the target sub-tag is a sub-tag that corresponds to transaction information (product information in discount activities) related to the target object from the at least one sub-tag.

Therefore, on the transaction scenario page 40, anchoring to the target sub-tag is performed to display a transaction content corresponding to the target sub-tag. It should be understood that the prompt information 110 corresponding to the target event refers to the transaction content corresponding to the target sub-tag.

Exemplarily, as shown in FIG. 10A and FIG. 10B, the transaction scenario page 40 is displayed, and includes a target tag ("Mall"), at least one sub-tag under the target tag, and the transaction content (prompt information 110) corresponding to the target sub-tag. The prompt information 110 is displayed under the first sub-tag ("discount of 50 for every 200 spent") in the form of an interface. Compared with FIG. 5B, at least one sub-tag in FIG. 10B is not displayed at the top, preserving some content of the transaction scenario page 40, thereby attracting the user to participate in the discount activity while not affecting basic functions corresponding to the target tag and reducing interference to the user.

C. Recharge Discount Information

Figure 11C:
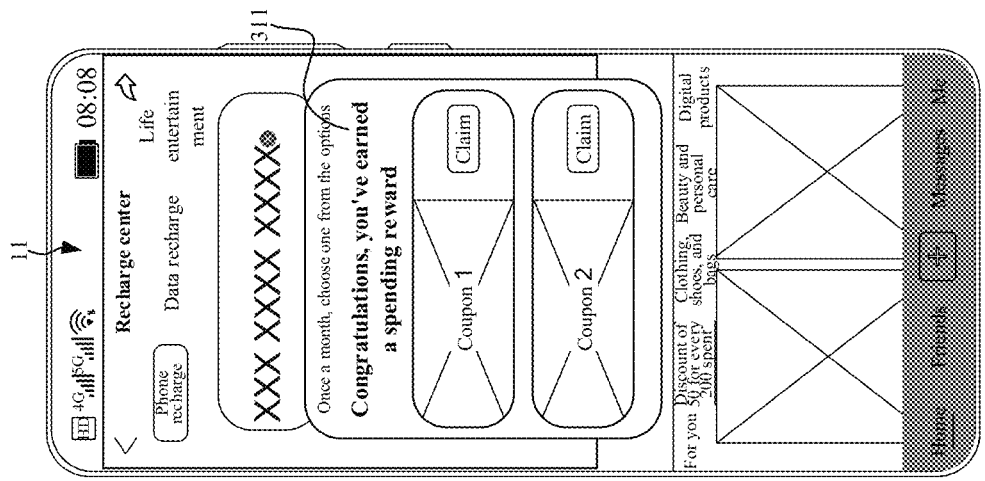
FIGS. 11A-11C are third schematic diagrams of prompt information according to an embodiment of the disclosure.

In some embodiments, when the transaction information of the marketing type includes the recharge discount information, the first guidance information is specifically used for guiding the user to recharge. As shown in FIG. 11A, the first guidance information is displayed nearby (upper right corner) of the target tag "Mall" in the form of a corner mark. If the trigger instruction for the target event corresponding to the target tag is detected, and the trigger duration of the trigger instruction satisfies the second condition, it indicates that the user triggers the target tag or the first guidance information after the first preset duration is exceeded (detecting the tap touch instruction for the target tag in FIG. 11A), indicating that the user may be interested in the recharge discount information but has a low level of interest.

Figure 11B:
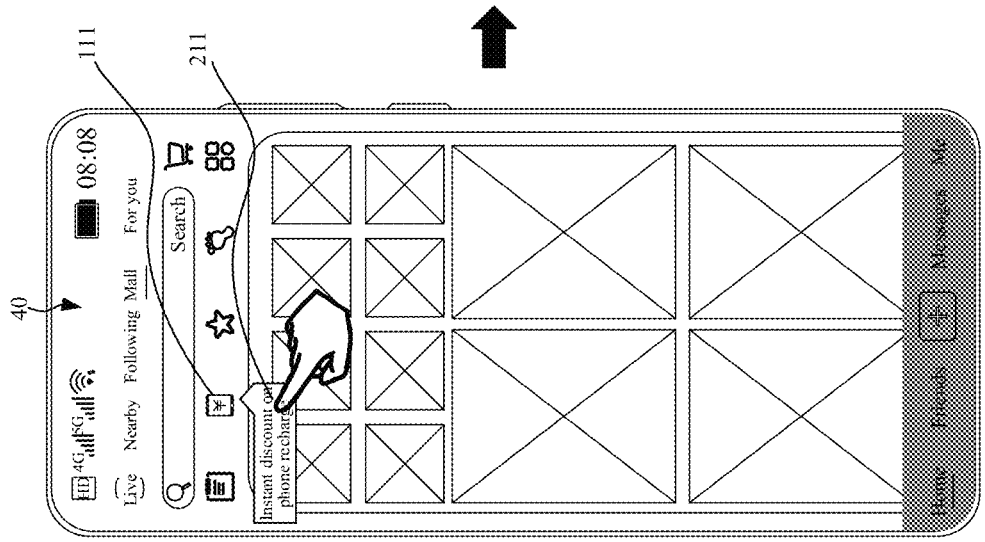
Figure 11A:
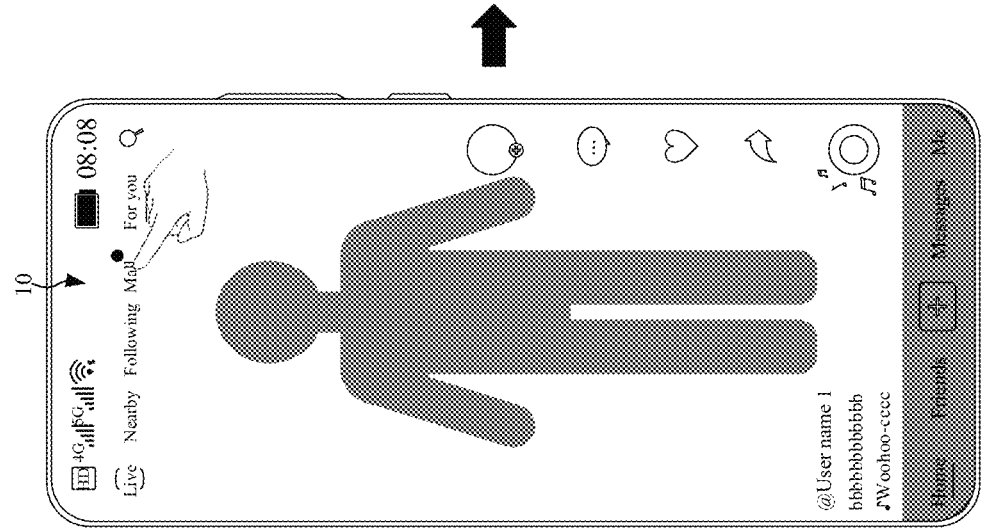

In order to achieve the purpose of guiding the user to participate in the recharge discount activity, as shown in the FIG. 11B, the transaction scenario page 40 corresponding to the target tag is displayed. The transaction scenario page 40 includes a target tag and at least one control under the target tag, and second guidance information 211 is displayed at a corresponding display position of a target control 111. The target control is determined according to the transaction information related to the target object, and the second guidance information is also determined according to the transaction information related to the target object. It should be understood that in this case, the prompt information corresponding to the target event is the second guidance information, and a display form of the second guidance information includes a pop-up window control in the form of a bubble, and/or a corner mark.

Exemplarily, as shown in FIGS. 11A to 11B, the tap touch instruction for the target tag "Mall" is detected after the first preset duration. As shown in FIG. 11B, the transaction scenario page 40 is displayed and includes the target tag "Mall", and at least one control under the target tag "Mall" (displayed in the form of icons in FIG. 11B, sequentially representing from left to right: Orders, Recharge, Favorites, Footprints, and More). The prompt information (second guidance information 211) is displayed at the corresponding display position of the target control 111 (Recharge). The content of the second guidance information 211 in FIG. 11B includes: instant discount on phone recharge, which is displayed below the target control 111 (recharge) with a pop-up window in the form of a bubble, and points to the target control 111 (Recharge).

Further, if a trigger instruction corresponding to the second guidance information is detected, a recharge landing page is displayed, and an event-associated interface corresponding to the target event is displayed on the recharge landing page in the form of a pop-up window, such as a recharge discount interface including recharge discount activity information.

Exemplarily, as shown in FIG. 11C, if a trigger instruction corresponding to the second guidance information 211 is detected, a recharge landing page 11 is displayed, and a recharge discount interface 311 is displayed on the recharge landing page 11 in the form of a pop-up window.

(2) Order Type

As mentioned earlier, the transaction information of the order type may include: order detail information, and product attribute update information in a shopping cart/favorites.

A. Order Detail Information

Figures 12A, 12B, 12C:
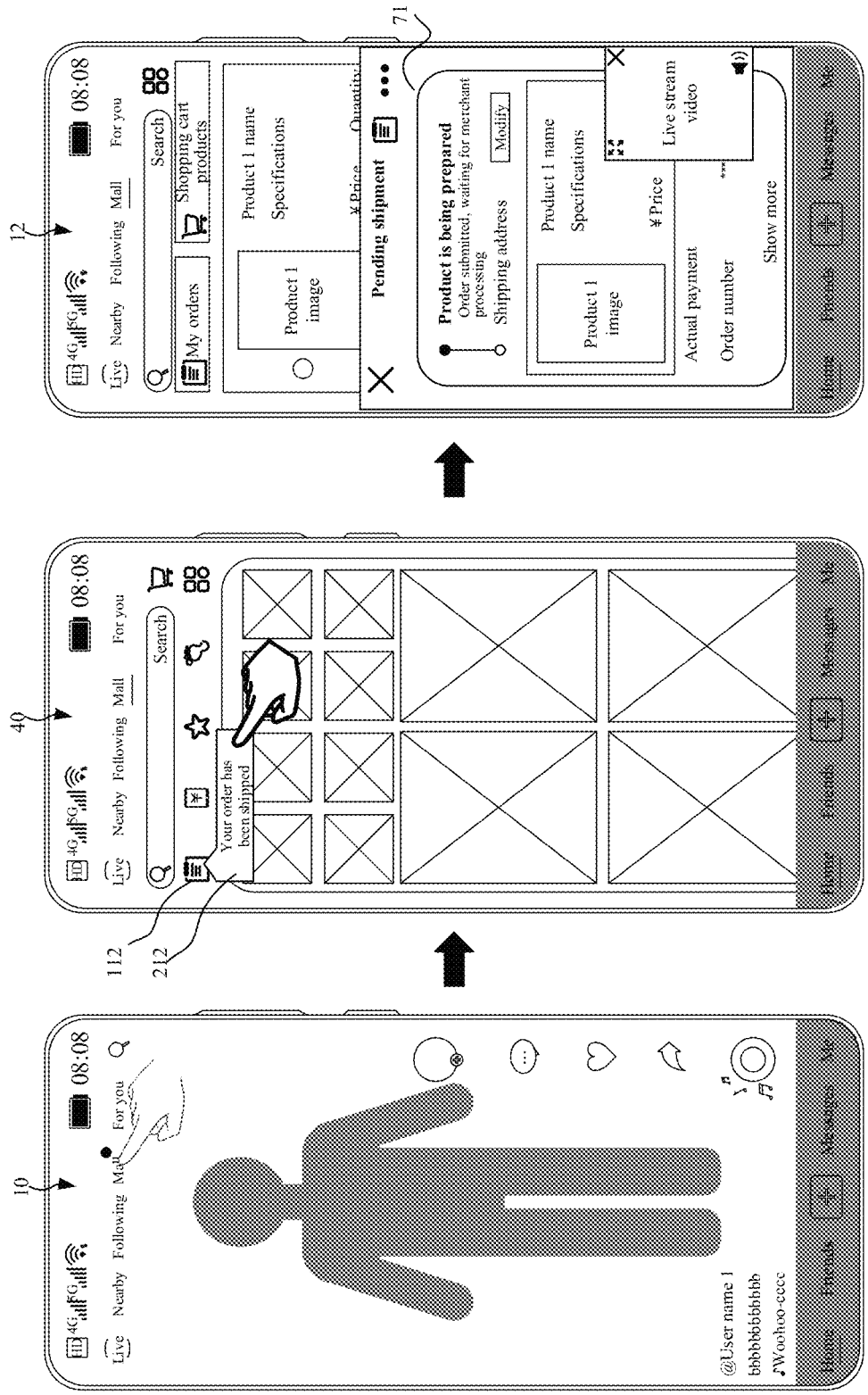
FIGS. 12A-12C are fourth schematic diagrams of prompt information according to an embodiment of the disclosure.

In some embodiments, when the transaction information of the marketing type includes the order detail information, the first guidance information is specifically used for guiding the user to view status information of the target object. As shown in FIG. 12A, the content of text description information included in the first guidance information includes: your order has been shipped. If the trigger instruction for the target event corresponding to the target tag is detected, and the trigger duration of the trigger instruction satisfies the second condition, it indicates that the user triggers the target tag or the first guidance information after the first preset duration is exceeded (detecting the tap touch instruction for the target tag in FIG. 12A), indicating that the user may be interested in order status update but has a low level of interest.

In order to guide for viewing the latest status of the target object in the order, as shown in the FIG. 12B, the transaction scenario page 40 corresponding to the target tag is displayed. The transaction scenario page 40 includes a target tag and at least one control under the target tag, and second guidance information 212 is displayed at a corresponding display position of a target control 112.

Exemplarily, as shown in FIGS. 12A to 12B, the tap touch instruction for the target tag "Mall" is detected after the first preset duration. As shown in FIG. 12B, the transaction scenario page 40 is displayed and includes the target tag "Mall", and at least one control under the target tag "Mall" (displayed in the form of icons in FIG. 12B, sequentially representing from left to right: Orders, Recharge, Favorites, Footprints, and More). The prompt information (second guidance information 212) is displayed at the corresponding display position of the target control 112 (Orders). The content of the second guidance information 212 in FIG. 12B includes: your order has been shipped, which is displayed below the target control 112 (Orders) with a pop-up window in the form of a bubble, and points to the target control 112 (Orders).

Further, if a trigger instruction corresponding to the second guidance information is detected, an order page is displayed, and an event-associated interface corresponding to the target event is pulled up on the order page, such as an order detail interface. The display area of the event-associated interface corresponding to the target event is smaller than the display area of the transaction scenario page.

Exemplarily, as shown in FIG. 12C, if a trigger instruction corresponding to the second guidance information 212 is detected, an order page 12 is displayed, and an order detail interface 71 is pulled up on the order page 12.

B. Product Attribute Update Information in a Shopping Cart/Favorites

Figure 13C:
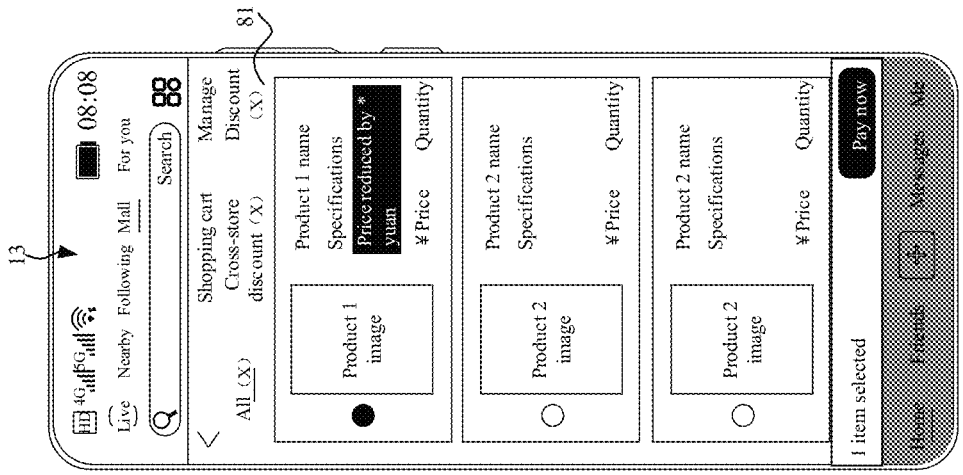
FIGS. 13A-13C are fifth schematic diagrams of prompt information according to an embodiment of the disclosure.

In some embodiments, when the transaction information of the marketing type includes the product attribute update information in the shopping cart/favorites, the first guidance information is specifically used for guiding the user to view updated product attributes in the shopping cart/favorites. As shown in FIG. 13A, the content of text description information included in the first guidance information includes: price drop for the product 1 in the shopping cart. If the trigger instruction for the target event corresponding to the target tag is detected, and the trigger duration of the trigger instruction satisfies the second condition, it indicates that the user triggers the target tag or the first guidance information after the first preset duration is exceeded (detecting the tap touch instruction for the target tag in FIG. 11A), indicating that the user may be interested in product attribute update but has a low level of interest. In order to guide the user to view the updated product attributes, as shown in FIG. 13B, the transaction scenario page 40 corresponding to the target tag is displayed, and includes a target tag and at least one control under the target tag, and second guidance information 213 is displayed at a corresponding display position of the target control 113.

Figure 13B:
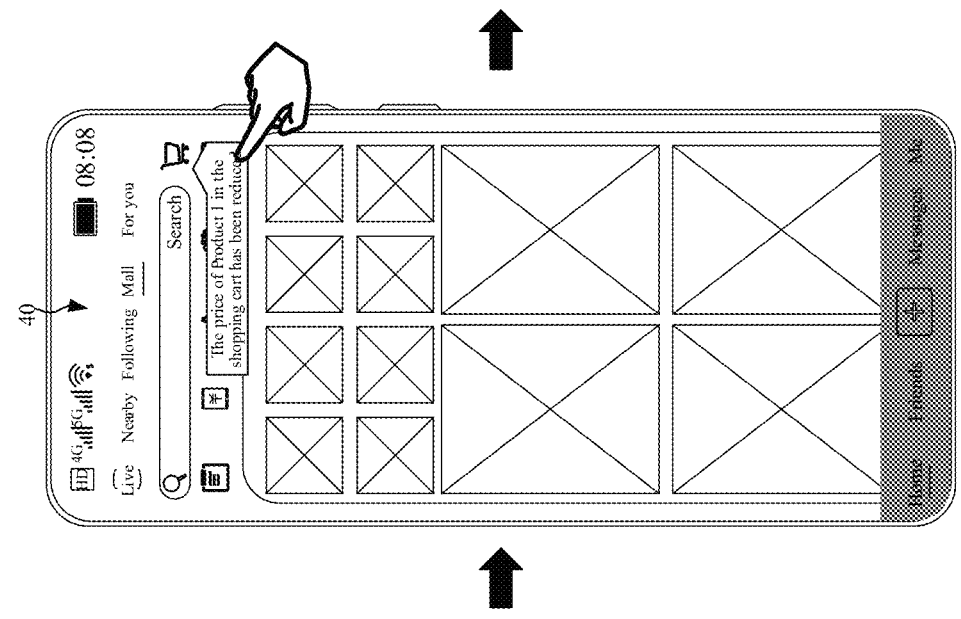
Figure 13A:
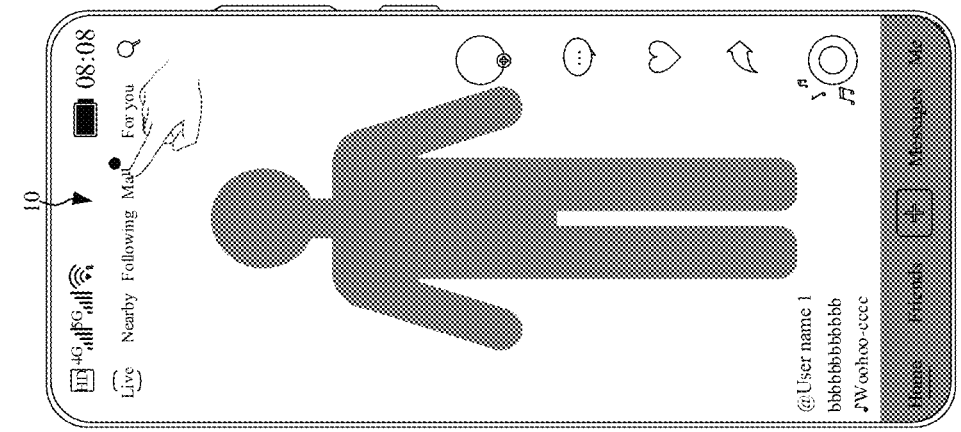

Exemplarily, as shown in FIGS. 13A to 13B, the tap touch instruction for the target tag "Mall" is detected after the first preset duration. As shown in FIG. 13B, the transaction scenario page 40 is displayed and includes the target tag "Mall", and at least one control under the target tag "Mall". The prompt information (second guidance information 213) is displayed at the corresponding display position of the target control 113 (Shopping cart). The content of the second guidance information 213 in FIG. 11B includes: the product 1 in the shopping cart has been reduced in price, which is displayed below the target control 113 (Shopping cart) with a pop-up window in the form of a bubble, and points to the target control 113 (Shopping cart).

Further, if a trigger instruction corresponding to the second guidance information is detected, a shopping cart/favorites page is displayed, and product attributes of the target object are highlighted on the shopping cart/favorites page.

Exemplarily, as shown in FIG. 13C, if a trigger instruction corresponding to the second guidance information 213 is detected, a shopping cart page 13 is displayed, a shopping cart/favorites interface 81 is displayed on the shopping cart page 13, and product attributes (reduced by * yuan) of the target object (Product 1) are highlighted.

(3) Equity Type

As mentioned earlier, the transaction information of the equity type may include: coupons corresponding to preset account information and off-price product benefit information.

Similar to the displays corresponding to the above two types of transaction information, the coupons corresponding to the preset account information may be displayed in the form of a pop-up window in a preset card area of the transaction scenario page. The off-price product benefit information may also be displayed under the target sub-tag on the transaction scenario page, so as to display some off-price product benefit information on the transaction scenario page, thereby achieving a subtle prompt effect. The second guidance information may also be displayed at the corresponding display position of the target control on the transaction scenario page, so as to further guide the user to enter a landing page corresponding to the equity type, and view the coupons or off-price product benefit information corresponding to the preset account information in the landing page. The specific display method is similar to that described in the foregoing embodiments, which is not repeated in the disclosure.

In the above embodiments, if the trigger instruction for the target event corresponding to the target tag is detected, and the trigger duration of the trigger instruction satisfies the second condition, it indicates that the user triggers the target tag or guidance information after the first preset duration is exceeded, indicating that the user has a low level of interest in the transaction information corresponding to the target event. However, in order to further guide the user, in the disclosure, the transaction scenario page is first displayed in response to the trigger instruction, then, the prompt information corresponding to the target event is displayed in a manner of subtle prompt on the transaction scenario page so as to guide the user to participate in the target event, thereby providing a different guidance method from the first condition, making the guidance method more diversified, and increasing the possibility of the user participating in the target event, ultimately achieving the purpose of guidance.

In summary, the embodiments of the disclosure provide the method for guiding and displaying a related content. According to the method, the target page is first displayed, and displays the first guidance information corresponding to the target tag, and the first guidance information is used for guiding the user to execute the target event corresponding to the target tag; when the trigger instruction for the target event is detected and the trigger duration of the trigger instruction satisfies the first condition, the transaction scenario page corresponding to the target tag is displayed, and the event-associated interface corresponding to the target event is displayed on the transaction scenario page; and when the trigger instruction for the target event is detected and the trigger duration of the trigger instruction satisfies the second condition, the transaction scenario page corresponding to the target tag is displayed, and the prompt information corresponding to the target event is displayed on the transaction scenario page. In the disclosure, the guidance information is displayed on the target page to guide the user, so as to display relevant information of the target event on the transaction scenario page in different forms according to different conditions satisfied by the duration of triggering the target event: the event-associated page or prompt information, thereby attracting the user to participate in the transaction activities in a diversified manner, increasing the possibility of the user participating in the transaction activities, and improving the guidance effect.

Figure 14:
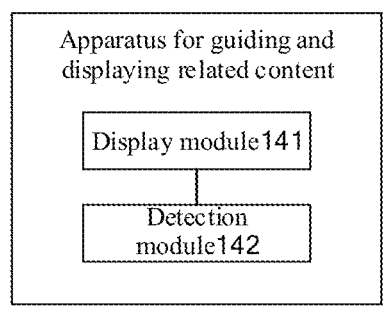
FIG. 14 is a structural schematic diagram of an apparatus for guiding and displaying a related content according to an embodiment of the disclosure.

As shown in FIG. 14, FIG. 14 is a structural schematic diagram of an apparatus for guiding and displaying a related content according to an embodiment of the disclosure. The apparatus includes:

- a display module 141, configured to display a target page, where the target page displays first guidance information corresponding to a target tag, and the first guidance information is used for guiding a user to perform a target event corresponding to the target tag; and
- a detection module 142, configured to display a transaction scenario page corresponding to the target tag if a trigger instruction for the target event corresponding to the target tag is detected, and a trigger duration of the trigger instruction satisfies a first condition, where the transaction scenario page corresponding to the target tag displays an event-associated interface corresponding to the target event, and
- a detection module 142 is further configured to display a transaction scenario page corresponding to the target tag if the trigger instruction for the target event corresponding to the target tag is detected, and the trigger duration of the trigger instruction satisfies a second condition, where the transaction scenario page corresponding to the target tag displays prompt information corresponding to the target event.

In some embodiments, a display form of the first guidance information includes a pop-up window control in the form of a bubble, and/or a corner mark.

The display content of the first guidance information corresponding to the target tag includes at least one of an image of a target object, text description information, and a marker icon; and the target object is a thing related to the target event.

The target event refers to displaying transaction information related to the target object. The types of the transaction information include at least one of the following: a marketing type, an order type, and an equity type.

In some embodiments, a trigger instruction for a target event includes at least one of the following:
- a tap touch instruction for the first guidance information;
- a tap touch instruction for the target tag; and
- a swipe touch instruction for a current tag on the target page, where the swipe touch instruction indicates a swipe from the current tag to the target tag.

In some embodiments, a trigger duration of a trigger instruction refers to a duration from the time when the first guidance information starts to be displayed to the time when the trigger instruction is detected. The first condition is that the trigger duration of the trigger instruction is less than or equal to a first preset duration. An event-associated interface corresponding to the target event displays transaction information related to the target object.

The display module 141 is specifically for: the display method for the event-associated interface corresponding to the target event on the transaction scenario page corresponding to the target tag includes at least one of the following:
- displaying the event-associated interface corresponding to the target event in the form of a pop-up window on the transaction scenario page corresponding to the target tag;
- anchoring to the event-associated interface corresponding to the target event on the transaction scenario page corresponding to the target tag, where the event-associated interface corresponding to the target event is a part of interface on the transaction scenario page corresponding to the target tag; and
- pulling up and displaying the event-associated interface corresponding to the target event on the transaction scenario page corresponding to the target tag, where the display area of the event-associated interface corresponding to the target event is smaller than the display area of the transaction scenario page.

In some embodiments, if the type of the transaction information is the marketing type, the event-associated interface corresponding to the target event is an interface including options for unclaimed coupons, or an interface including products in discount activities, or an interface including recharge discount information;
- if the type of the transaction information is the order type, the event-associated interface corresponding to the target event is an interface including order detail information of the target object, or an interface including attribute update information of the target object; and
- if the type of the transaction information is the equity type, the event-associated interface corresponding to the target event is an interface including equity information corresponding to a preset user.

In some embodiments, a trigger duration of the trigger instruction refers to a duration from the time when the first guidance information starts to be displayed to the time when the trigger instruction is detected. The second condition is that the trigger duration of the trigger instruction is greater than a first preset duration. Prompt information corresponding to the target event is determined according to the transaction information related to the target event.

In some embodiments, the display module 141 is specifically for: the display method for the prompt information corresponding to the target event on the transaction scenario page corresponding to the target tag includes at least one of the following:
- displaying the prompt information corresponding to the target event in the form of a card in a preset card display area of the transaction scenario page corresponding to the target tag;
- anchoring to a target sub-tag on the transaction scenario page corresponding to the target tag, and displaying the transaction content corresponding to the target sub-tag, where the target sub-tag is a tag corresponding to transaction information related to the target object; and
- displaying the second guidance information at a corresponding display position of a target control on the transaction scenario page corresponding to the target tag, where both the target control and the second guidance information are determined according to the transaction information related to the target object.

In some embodiments, the first guidance information is displayed in an area corresponding to a display area of the target tag on the target page.

The display module 141 is further configured to display the first guidance information on the target page when pop-up conditions configured corresponding to the first guidance information are met.

The pop-up conditions include at least one of the following:
- current time is within a display time range corresponding to the first guidance information;
- account information matches the target event;
- a display frequency of the first guidance information is less than a preset frequency; and
- the first guidance information has the highest priority among guidance information to be displayed.

Figure 15:
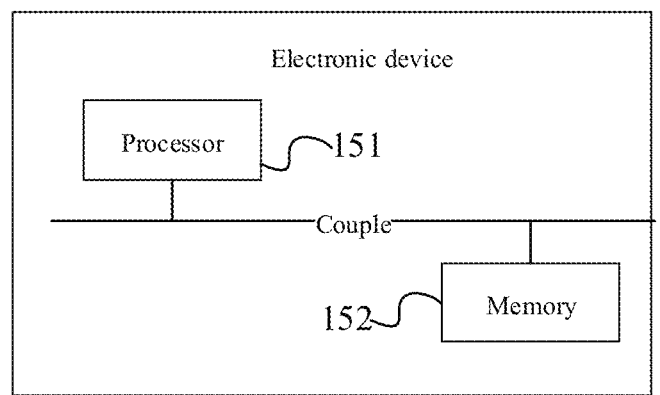
FIG. 15 is a structural schematic diagram of an electronic device according to an embodiment of the disclosure.

As shown in FIG. 15, FIG. 15 is a structural schematic diagram of an electronic device according to an embodiment of the disclosure. The electronic device includes: a processor, a memory, and a computer program stored on the memory and running on the processor. The computer program, when executed by the processor, implements various processes of the method for displaying an application content in the above method embodiments. The same technical effects can be achieved. To avoid repetition, detailed descriptions are omitted.

An embodiment of the disclosure provides a computer-readable storage medium. The computer-readable storage medium stores a computer program. The computer program, when executed by a processor, implements various processes of the method for displaying an application content in the above method embodiments. The same technical effects can be achieved. To avoid repetition, detailed descriptions are omitted.

The computer-readable storage medium may be a read-only memory (ROM), a random access memory (RAM), a magnetic disk, or an optical disk, etc.

An embodiment of the disclosure provides a computer program product. The computer program product stores a computer program. The computer program, when executed by a processor, implements various processes of the method for displaying an application content in the above method embodiments. The same technical effects can be achieved. To avoid repetition, detailed descriptions are omitted.

Those skilled in the art should understand that the embodiments of the disclosure may be provided as a method, a system, or a computer program product. Therefore, the disclosure may be in the form of a fully hardware embodiment, a fully software embodiment, or an embodiment combining software and hardware aspects. In addition, the disclosure may use a form of a computer program product implemented on one or more computer-usable storage media including computer-usable program code.

In the disclosure, the processor may be a central processing unit (CPU), or other general-purpose processors, a digital signal processor (DSP), an application specific integrated circuit (ASIC), a field-programmable gate array (FPGA) or other programmable logic devices, discrete gate or transistor logic devices, discrete hardware components, etc. The general-purpose processor may be a microprocessor, or any conventional processor, etc.

In the disclosure, the memory may include a volatile memory, a random access memory (RAM), and/or a non-volatile internal memory, and other forms in a computer-readable medium, such as a read-only memory (ROM) or a flash RAM. The memory is an example of a computer-readable medium.

In the disclosure, the computer-readable medium includes permanent and non-permanent, removable and non-removable storage media. The storage medium may store information by any method or technology. The information may be a computer-readable instruction, a data structure, a program module, or other data. Examples of the computer storage medium include, but are not limited to, a phase change memory (PRAM), a static random access memory (SRAM), a dynamic random access memory (DRAM), other types of random access memory (RAM), a read-only memory (ROM), an electrically erasable programmable read-only memory (EEPROM), a flash memory or other memory technologies, a compact disc read-only memory (CD-ROM), a digital versatile disc (DVD) or other optical storage, a magnetic cassette tape, a magnetic disk storage, or other magnetic storage devices, or any other non-transmission medium that can be configured to store information accessible to a computing device. According to the definition herein, the computer-readable medium does not include transitory computer readable media, such as modulated data signals and carrier waves.

It should be noted that herein, relational terms such as "first" and "second" are used only to distinguish one entity or operation from another and do not necessarily require or imply any actual relationship or order between these entities or operations. In addition, terms "comprise", "include", or any other variations thereof are intended to cover non-exclusive inclusion, and therefore a process, a method, an object, or a device including a series of elements not only includes those elements but also includes other elements not clearly listed, or further includes inherent elements for the process, the method, the object, or the device. In the absence of further restrictions, an element specified by the phrase "including a . . . " does not exclude the existence of other identical elements in the process, method, product, or, device that includes the element.

The above contents are merely specific implementations of the disclosure, such that those skilled in the art can understand or implement the disclosure. More modifications for these embodiments are apparent to those skilled in the art, and general principles defined herein may be implemented in other embodiments without departing from the spirit or scope of the disclosure. Therefore, the disclosure will not be limited by these embodiments shown herein but is required to conform to a widest scope consistent with the principles and novel characteristics disclosed herein.

I claim:

1. A method implemented by a computing device for improving effectiveness of content presentation, comprising:
   displaying, by the computing device, a target page comprising a target tag, wherein the target page displays first guidance information, and wherein the first guidance information is configured to provide guidance on performing a target event associated with the target tag;
   detecting, by the computing device, a trigger instruction for the target event in a trigger duration, wherein the trigger duration is a duration from a time when the first guidance information starts to be displayed to a time when the trigger instruction is detected;
   determining, by the computing device, whether the trigger duration is less than or equal to a first predetermined duration;
   in response to determining that the trigger duration is less than or equal to the first predetermined duration, displaying a page corresponding to the target tag and displaying an interface associated with the target event on the page by the computing device, wherein the displaying an interface associated with the target event on the page comprises overlaying the interface on the page or displaying the interface below a sub-tag in the page; and
   in response to determining that the trigger duration is greater than the first predetermined duration, displaying the page corresponding to the target tag and displaying prompt information corresponding to the target event on the page by the computing device.

2. The method according to claim 1, wherein a display form of the first guidance information comprises a pop-up window control in a form of a bubble or a corner mark; and
   wherein the first guidance information corresponding to the target tag comprises at least one of an image, text description information, or a marker icon.

3. The method according to claim 1, wherein a trigger instruction for the target event comprises at least one of:

a tap touch instruction for the first guidance information;
a tap touch instruction for the target tag; and
a swipe touch instruction for a current tag on the target page, wherein the swipe touch instruction indicates a swipe from the current tag to the target tag.

4. The method according to claim 1, comprising at least one of:
displaying the interface associated with the target event in a form of a pop-up window on the page corresponding to the target tag;
anchoring the interface associated with the target event to the sub-tag in the page corresponding to the target tag, wherein the interface associated with the target event is a part of interfaces within the page corresponding to the target tag; or
pulling up and displaying the interface associated with the target event on the page corresponding to the target tag, wherein a display area of the interface associated with the target event is smaller than a display area of the page.

5. The method according to claim 1, wherein the interface associated with the target event comprises an interface configured to present options for unclaimed coupons, an interface configured to present products in discount activities, an interface configured to present recharge discount information, an interface configured to present order detail information of one or more objects, an interface configured to present attribute update information of the one or more objects, an interface configured to present information corresponding to a preset user.

6. The method according to claim 1, comprising at least one of:
displaying the prompt information corresponding to the target event in a form of a card in a preset card display area of the page corresponding to the target tag; or
displaying second guidance information at a corresponding display position of a target control on the page corresponding to the target tag.

7. The method according to claim 1, wherein the first guidance information is displayed in an area corresponding to a display area of the target tag on the target page;
wherein the method further comprises displaying the first guidance information on the target page when pop-up conditions configured corresponding to the first guidance information are satisfied; and
wherein the pop-up conditions comprise at least one of:
current time being within a display time range corresponding to the first guidance information,
account information matching the target event,
a display frequency of the first guidance information being less than a preset frequency, or
the first guidance information having a highest priority among guidance information to be displayed.

8. An electronic device, comprising:
one or more processors; and
a storage, configured to store one or more programs, wherein the one or more programs, when executed by the one or more processors, cause the electronic device to:
display, by the electronic device, a target page comprising a target tag, wherein the target page displays first guidance information, and wherein the first guidance information is configured to provide guidance on performing a target event associated with to the target tag;
detect, by the electronic device, a trigger instruction for the target event in a trigger duration, wherein the trigger duration is a duration from a time when the first guidance information starts to be displayed to a time when the trigger instruction is detected;
determine, by the electronic device, whether the trigger duration is less than or equal to a first predetermined duration;
in response to determining that the trigger duration is less than or equal to the first predetermined duration, display a page corresponding to the target tag and display an interface associated with the target event on the page by the electronic device, wherein displaying an interface associated with the target event on the page comprises overlaying the interface on the page or displaying the interface below a sub-tag in the page; and
in response to determining that the trigger duration is greater than the first predetermined duration, display the page corresponding to the target tag and displaying prompt information corresponding to the target event on the page by the electronic device.

9. The electronic device according to claim 8, wherein a display form of the first guidance information comprises a pop-up window control in a form of a bubble or a corner mark; and
wherein the first guidance information corresponding to the target tag comprises at least one of an image, text description information, or a marker icon.

10. The electronic device according to claim 8, wherein a trigger instruction for the target event comprises at least one of:
a tap touch instruction for the first guidance information;
a tap touch instruction for the target tag; and
a swipe touch instruction for a current tag on the target page, wherein the swipe touch instruction indicates a swipe from the current tag to the target tag.

11. The electronic device according to claim 8, wherein the one or more programs, when executed by the one or more processors, cause the electronic device to perform at least one of operations comprising:
displaying the interface associated with the target event in a form of a pop-up window on the page corresponding to the target tag;
anchoring the interface associated with the target event to the sub-tag in the page corresponding to the target tag, wherein the interface associated with the target event is a part of interfaces within the page corresponding to the target tag; or
pulling up and displaying the interface associated with the target event on the page corresponding to the target tag, wherein a display area of the interface associated with the target event is smaller than a display area of the page.

12. The electronic device according to claim 8, wherein interface associated with the target event comprises an interface configured to present options for unclaimed coupons, an interface configured to present products in discount activities, an interface configured to present recharge discount information, an interface configured to present order detail information of one or more objects, an interface configured to present attribute update information of the one or more objects, or an interface configured to present information corresponding to a preset user.

13. The electronic device according to claim 8, wherein the one or more programs, when executed by the one or more processors, cause the electronic device to perform at least one of operations comprising:

displaying the prompt information corresponding to the target event in a form of a card in a preset card display area of the page corresponding to the target tag; or displaying second guidance information at a corresponding display position of a target control on the page corresponding to the target tag.

14. The electronic device according to claim 8, wherein the first guidance information is displayed in an area corresponding to a display area of the target tag on the target page; wherein the one or more processors further cause the electronic device to:

display the first guidance information on the target page when pop-up conditions configured corresponding to the first guidance information are satisfied; and wherein the pop-up conditions comprise at least one of:
current time being within a display time range corresponding to the first guidance information,
account information matching the target event,
a display frequency of the first guidance information being less than a preset frequency, or
the first guidance information having a highest priority among guidance information to be displayed.

15. A non-transitory computer-readable storage medium, storing a computer program, wherein the computer program, when executed by a computing device, causes the computing device to:

display, by the computing device, a target page comprising a target tag, wherein the target page displays first guidance information, and wherein the first guidance information is configured to provide guidance on performing a target event associated with the target tag;

detect, by the computing device, a trigger instruction for the target event in a trigger duration, wherein the trigger duration is a duration from a time when the first guidance information starts to be displayed to a time when the trigger instruction is detected;

determine, by the computing device, whether the trigger duration is less than or equal to a first predetermined duration;

in response to determining that the trigger duration is less than or equal to the first predetermined duration, display a page corresponding to the target tag and display an interface associated with the target event on the page by the computing device, wherein displaying an interface associated with the target event on the page comprises overlaying the interface on the page or displaying the interface below a sub-tag in the page; and in response to determining that the trigger duration is greater than the first predetermined duration, display the page corresponding to the target tag and display prompt information corresponding to the target event on the page by the computing device.

16. The non-transitory computer-readable storage medium according to claim 15, wherein a display form of the first guidance information comprises a pop-up window control in a form of a bubble, or a corner mark; and wherein the first guidance information corresponding to the target tag comprises at least one of an image, text description information, or a marker icon.

17. The non-transitory computer-readable storage medium according to claim 15, wherein a trigger instruction for the target event comprises at least one of:
a tap touch instruction for the first guidance information;
a tap touch instruction for the target tag; and
a swipe touch instruction for a current tag on the target page, wherein the swipe touch instruction indicates a swipe from the current tag to the target tag.

18. The non-transitory computer-readable storage medium according to claim 15, wherein the computer program, when executed by a computing device, causes the computing device to perform at least one of operations comprising:

displaying the interface associated with the target event in a form of a pop-up window on the page corresponding to the target tag;

anchoring the interface associated with the target event to the sub-tag in the page corresponding to the target tag, wherein the interface associated with the target event is a part of interfaces within the page corresponding to the target tag; or pulling up and displaying the interface associated with the target event on the page corresponding to the target tag, wherein a display area of the interface associated with the target event is smaller than a display area of the page.

19. The non-transitory computer-readable storage medium according to claim 15, wherein the interface associated with the target event comprises an interface configured to present options for unclaimed coupons, an interface configured to present products in discount activities, an interface configured to present recharge discount information, an interface configured to present order detail information of one or more objects, an interface configured to present attribute update information of the one or more objects, an interface configured to present information corresponding to a preset user.

20. The non-transitory computer-readable storage medium according to claim 15, wherein the computer program, when executed by a computing device, causes the computing device to perform at least one of operations comprising:

displaying the prompt information corresponding to the target event in a form of a card in a preset card display area of the page corresponding to the target tag; or displaying second guidance information at a corresponding display position of a target control on the page corresponding to the target tag.

\* \* \* \* \*